(12) United States Patent  
Shibata et al.

(10) Patent No.: US 12,403,614 B2  
(45) Date of Patent: Sep. 2, 2025

(54) HOLDING DEVICE, CARGO HANDLING APPARATUS, AND HOLDING METHOD

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Motojiro Shibata, Yokohama (JP); Yukihiro Ikeya, Yokohama (JP); Takeshi Toyoshima, Yokohama (JP); Toshikazu Taki, Yokohama (JP); Hiroaki Fujihara, Kawasaki (JP); Yusuke Mitsuya, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 803 days.

(21) Appl. No.: 17/574,849

(22) Filed: Jan. 13, 2022

(65) Prior Publication Data

US 2022/0219337 A1 Jul. 14, 2022

(30) Foreign Application Priority Data

Jan. 14, 2021 (JP) .................................. 2021-004521  
Sep. 7, 2021 (JP) .................................. 2021-145766

(51) Int. Cl.  
*B25J 15/00* (2006.01)  
*B25J 15/06* (2006.01)

(52) U.S. Cl.  
CPC ....... *B25J 15/0052* (2013.01); *B25J 15/0004* (2013.01); *B25J 15/0691* (2013.01)

(58) Field of Classification Search  
CPC . B25J 15/0052; B25J 15/0616; B65G 47/912; B65G 47/914; B65G 47/918  
USPC ........................................................... 294/65  
See application file for complete search history.

(56) References Cited

U.S. PATENT DOCUMENTS

| 5,044,143 A | 9/1991 | Ako et al. |
| 5,564,893 A * | 10/1996 | Tacchi ................. B65G 47/902 414/797 |
| 6,652,014 B2 * | 11/2003 | Schmalz ............. B25J 15/0616 414/737 |

(Continued)

FOREIGN PATENT DOCUMENTS

| CN | 111703687 A | 9/2020 |
| EP | 3 623 324 A1 | 3/2020 |

(Continued)

OTHER PUBLICATIONS

Japanese Office Action issued Sep. 27, 2024 in Japanese Application 2021-145766, (with unedited computer-generated English translation), 9 pages.

(Continued)

*Primary Examiner* — Paul T Chin  
(74) *Attorney, Agent, or Firm* — Oblon, McClelland, Maier & Neustadt, L.L.P.

(57) ABSTRACT

According to one embodiment, a holding device includes a first holder configured to hold an upper surface of an article, and a second holder configured to hold a side surface of the article. The holding device performs at least a first operation of the first and second holders holding the article, and a second operation of only the first holder holding the article.

17 Claims, 27 Drawing Sheets

(56) References Cited

U.S. PATENT DOCUMENTS

| | | | |
|---|---|---|---|
| 9,498,887 B1* | 11/2016 | Zevenbergen | ........ B25J 15/0052 |
| 9,758,300 B2* | 9/2017 | Nakamura | ............ B65G 47/912 |
| 10,226,865 B2* | 3/2019 | Nakayama | .............. B25J 9/1669 |
| 2013/0096713 A1 | 4/2013 | Takizawa et al. | |
| 2014/0179501 A1 | 6/2014 | Akama et al. | |
| 2016/0137435 A1 | 5/2016 | Tanaka et al. | |
| 2017/0106534 A1 | 4/2017 | Nakamoto et al. | |
| 2017/0107058 A1 | 4/2017 | Nakamoto et al. | |
| 2018/0207808 A1 | 7/2018 | Tanaka | |
| 2018/0229987 A1 | 8/2018 | Kaup | |
| 2021/0069902 A1 | 3/2021 | Nakamoto et al. | |
| 2021/0101760 A1 | 4/2021 | Yabe | |

FOREIGN PATENT DOCUMENTS

| | | |
|---|---|---|
| JP | 62-141000 A | 6/1987 |
| JP | 02-062303 A | 3/1990 |
| JP | 03-085205 A | 4/1991 |
| JP | 04-217515 A | 8/1992 |
| JP | 04-371500 A | 12/1992 |
| JP | 05-004722 A | 1/1993 |
| JP | 05-010398 U | 2/1993 |
| JP | 07-010278 A | 1/1995 |
| JP | 07-041175 A | 2/1995 |
| JP | 08-175799 A | 7/1996 |
| JP | 08-239199 A | 9/1996 |
| JP | 08-268142 A | 10/1996 |
| JP | 9-141588 A | 6/1997 |
| JP | 09-309697 A | 12/1997 |
| JP | 10-087074 A | 4/1998 |
| JP | 2013-086914 A | 5/2013 |
| JP | 2014-024616 A | 2/2014 |
| JP | 2014-124798 A | 7/2014 |
| JP | 2016-055995 A | 4/2016 |
| JP | 2016-094280 A | 5/2016 |
| JP | 2017-052052 A | 3/2017 |
| JP | 2017-149565 A | 8/2017 |
| JP | 2018-118337 A | 8/2018 |
| JP | 2018-521931 A | 8/2018 |
| JP | 2018-176348 A | 11/2018 |
| JP | 2019-094210 A | 6/2019 |
| JP | 2019-218165 A | 12/2019 |
| JP | 2019-218166 A | 12/2019 |
| JP | 2020-001844 A | 1/2020 |
| JP | 2020-040788 A | 3/2020 |
| JP | 2021-041468 A | 3/2021 |
| WO | WO 2016/033172 A1 | 3/2016 |
| WO | WO 2019/049772 A1 | 3/2019 |
| WO | WO 2019/244846 A1 | 12/2019 |

OTHER PUBLICATIONS

Combined Chinese Office Action and Search Report issued Jul. 12, 2024 in Chinese Patent Application No. 202210041720.7, (with English translation), 8 pages.

* cited by examiner

FIG. 9A
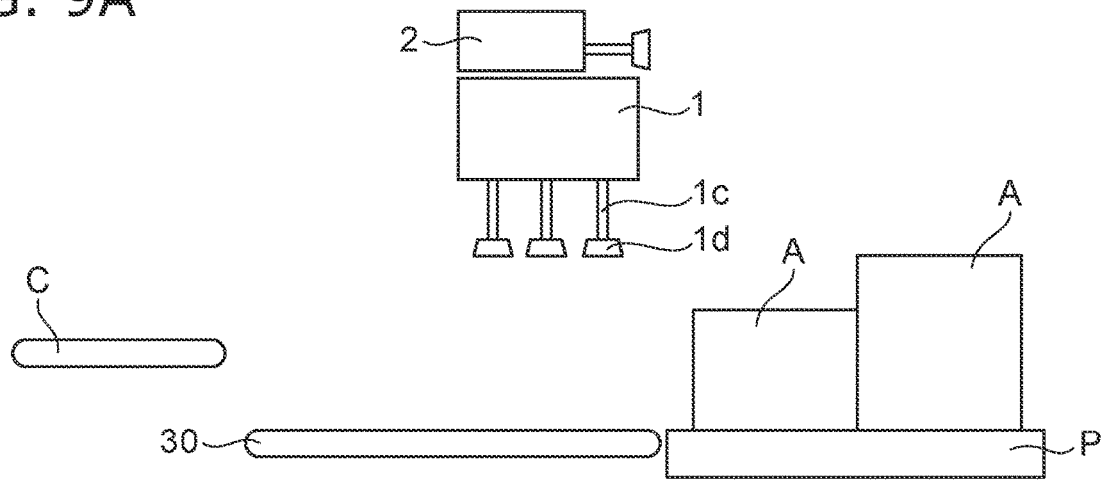
FIG. 9B
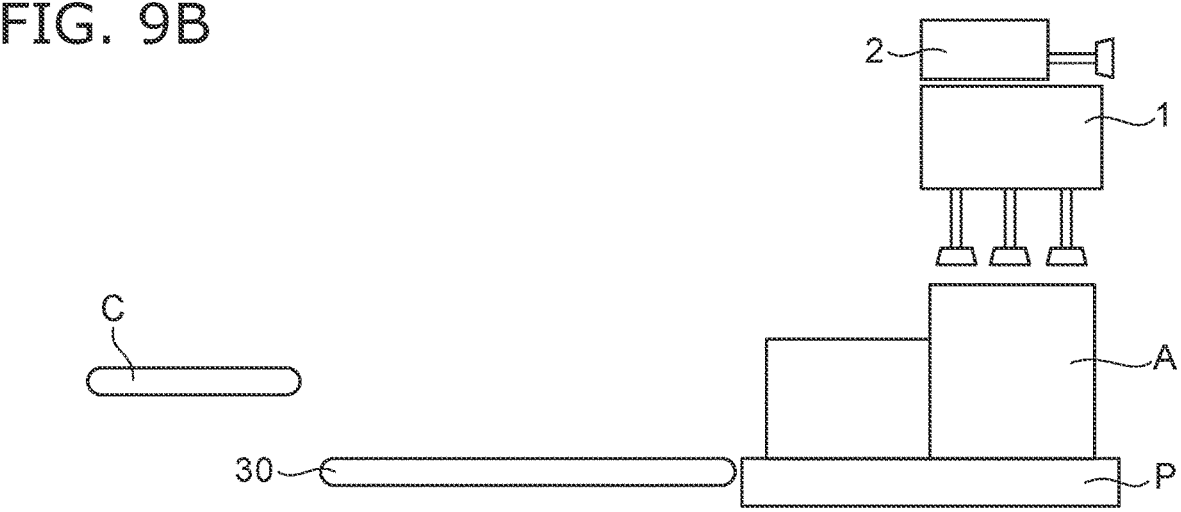
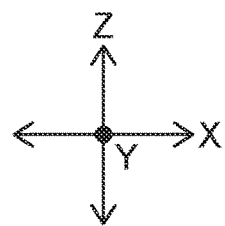

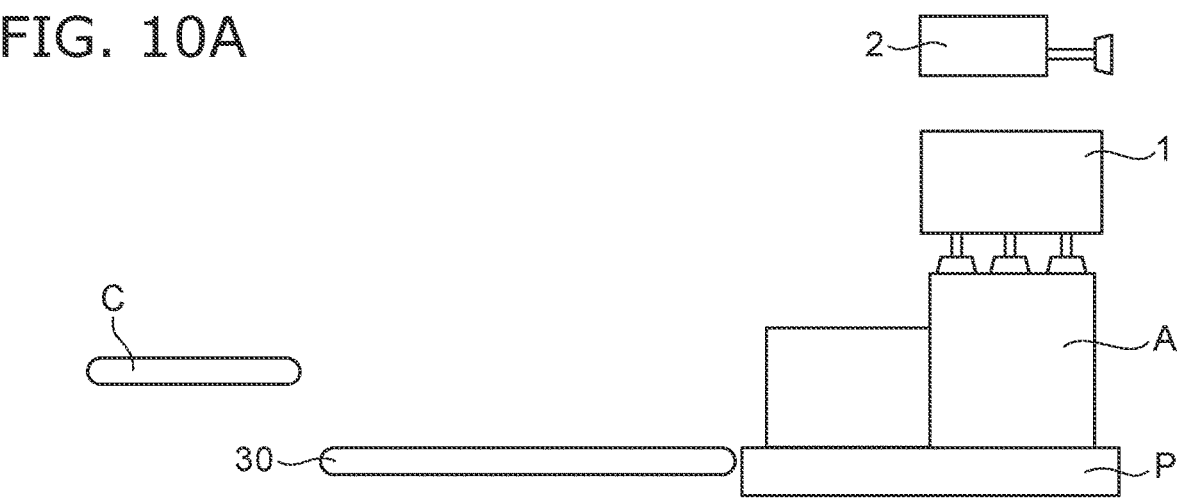
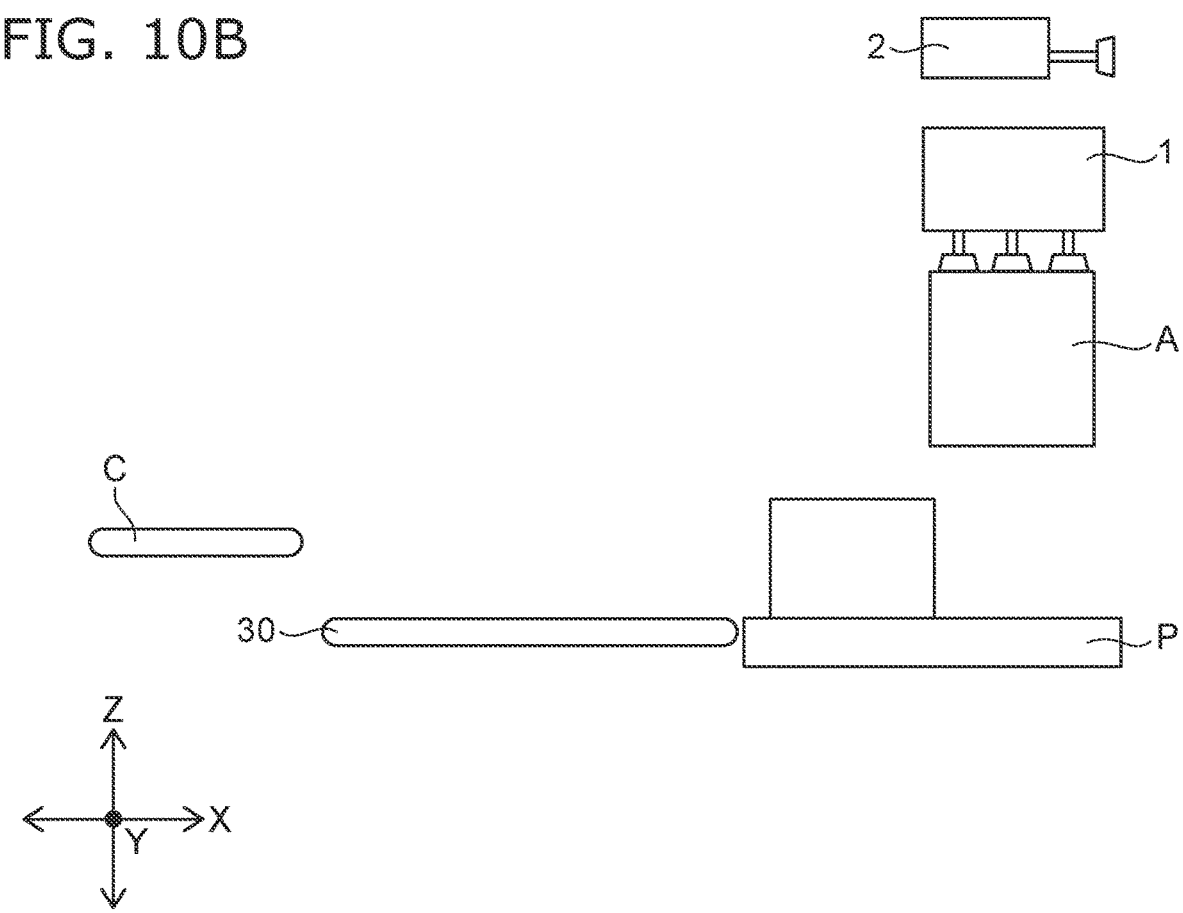

FIG. 11A
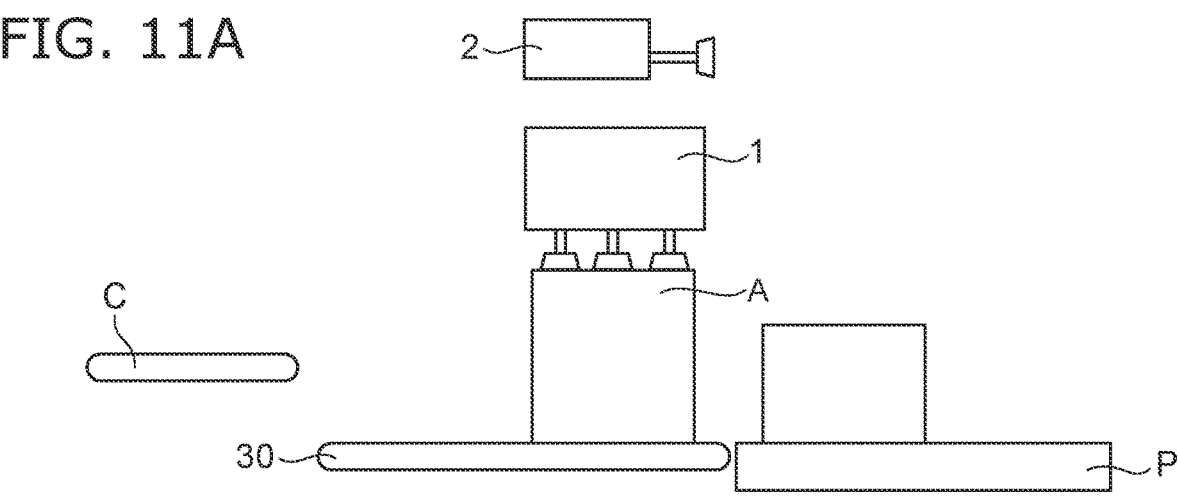
FIG. 11B
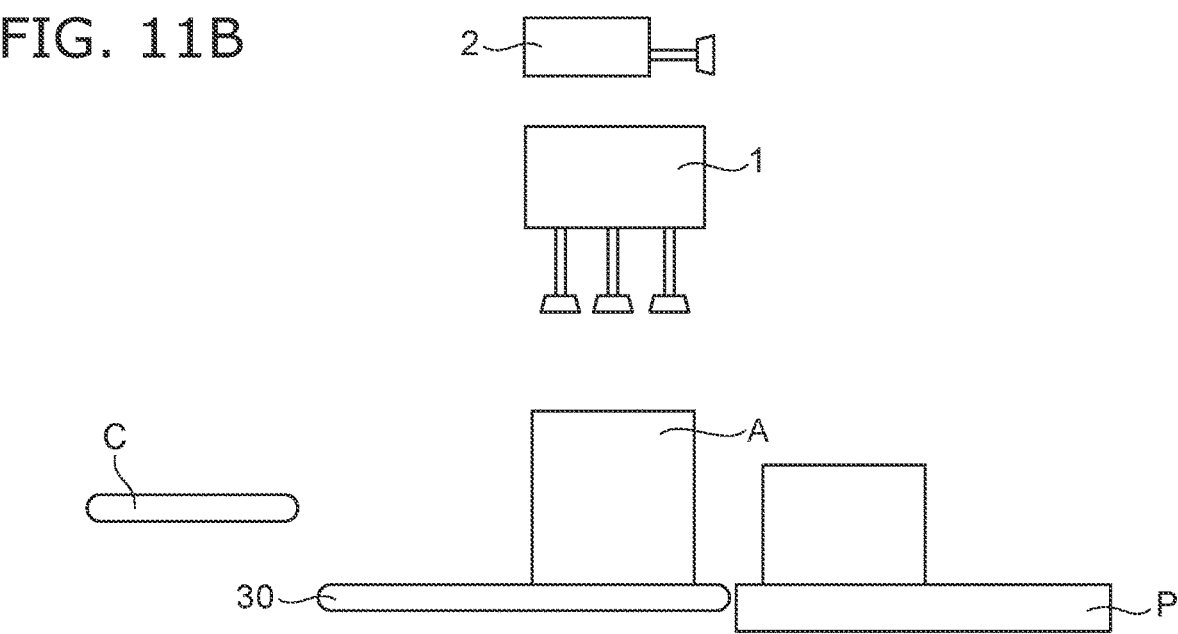
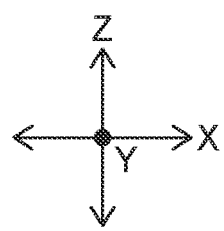

FIG. 14A
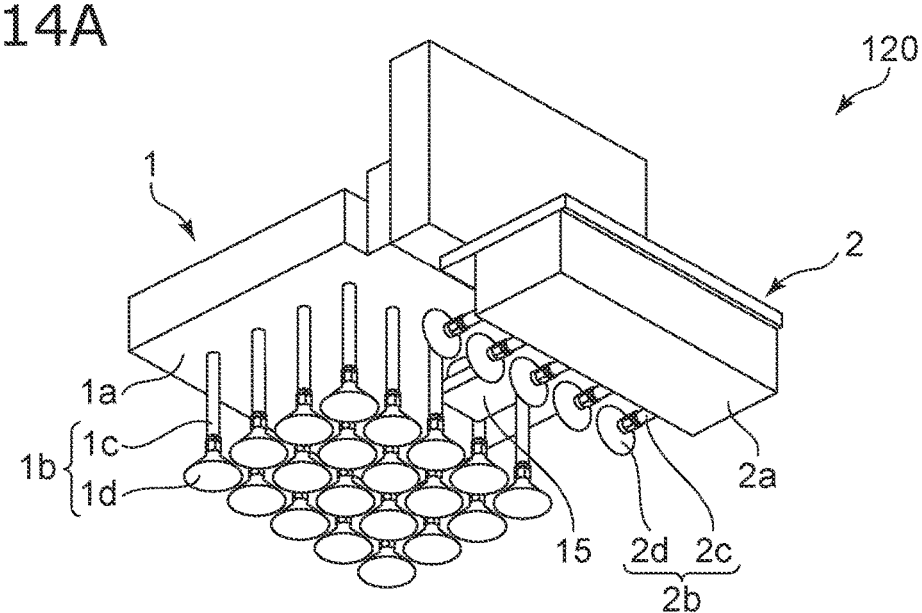
FIG. 14B
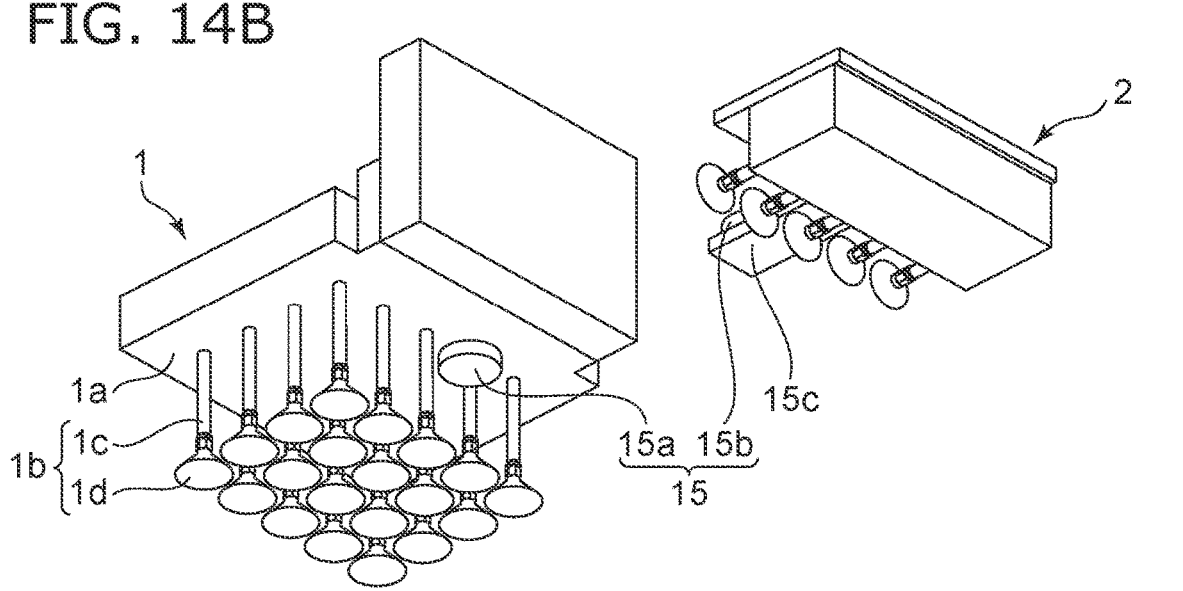
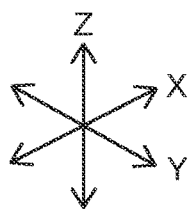

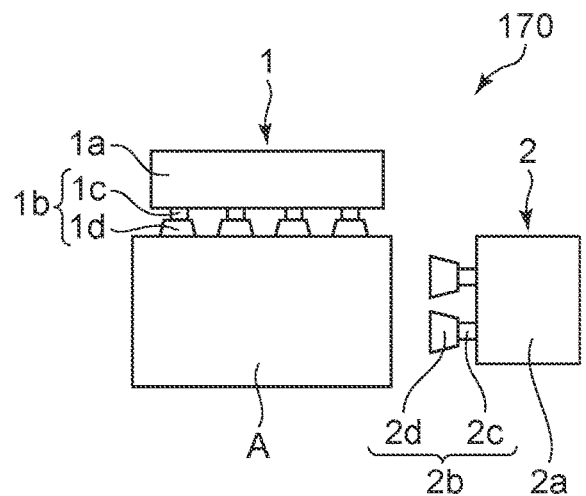
FIG. 23A
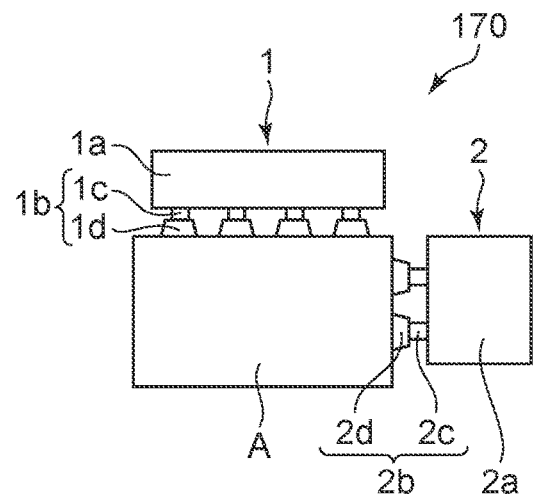
FIG. 23B
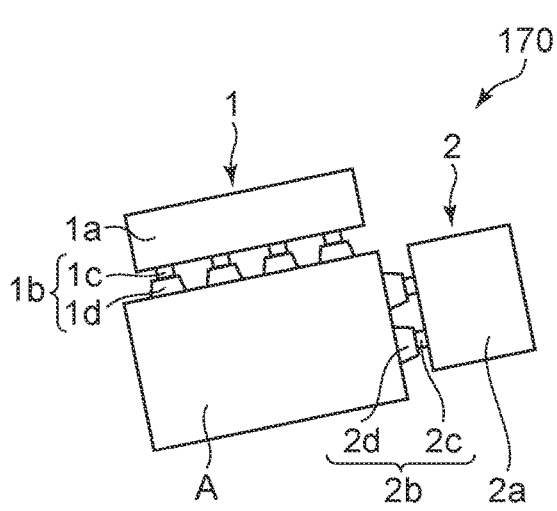
FIG. 23C
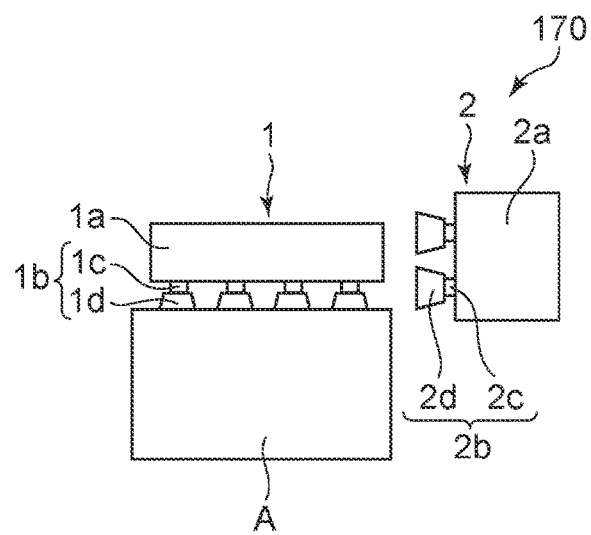
FIG. 23D
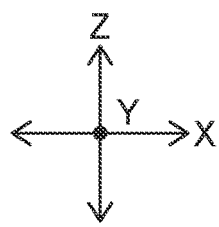

HOLDING DEVICE, CARGO HANDLING APPARATUS, AND HOLDING METHOD

CROSS-REFERENCE TO RELATED APPLICATIONS

This application is based upon and claims the benefit of priority from Japanese Patent Application No. 2021-004521, filed on Jan. 14, 2021; and Japanese Patent Application No. 2021-145766, filed on Sep. 7, 2021; the entire contents of which are incorporated herein by reference.

FIELD

Embodiments described herein relate generally to a holding device, a cargo handling apparatus, and a holding method.

BACKGROUND

There is an apparatus that holds an article. It is desirable to improve the convenience of such an apparatus.

BRIEF DESCRIPTION OF THE DRAWINGS

FIGS. 9A and 9B are schematic views illustrating the second operation of the holding device according to the first embodiment;

FIGS. 10A and 10B are schematic views illustrating the second operation of the holding device according to the first embodiment;

FIGS. 11A and 11B are schematic views illustrating the second operation of the holding device according to the first embodiment;

FIGS. 14A and 14B are perspective views illustrating the first and second holders of a holding device according to a second modification of the first embodiment;

FIGS. 23A to 23D are side views schematically showing states when the suction hand according to the embodiment holds the article;

DETAILED DESCRIPTION

Figure 1:
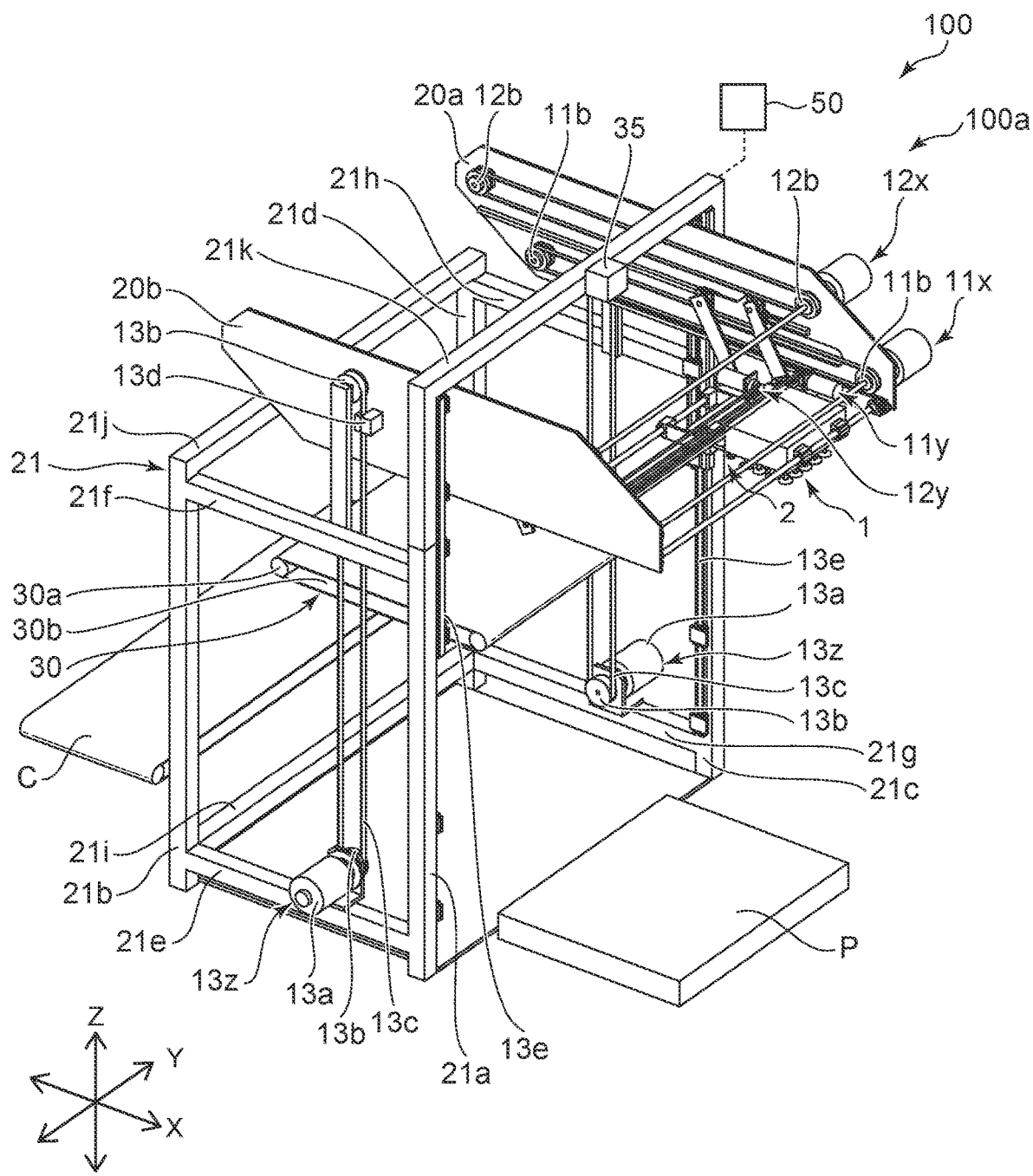
FIG. 1 is a perspective view illustrating a holding device according to a first embodiment.

According to one embodiment, a holding device includes a first holder configured to hold an upper surface of an article, and a second holder configured to hold a side surface of the article. The holding device performs at least a first operation of the first and second holders holding the article, and a second operation of only the first holder holding the article.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a perspective view illustrating a holding device according to a first embodiment.

As illustrated in FIG. 1, the holding device 100 according to the first embodiment includes a first holder 1, a second holder 2, drivers 11x, 11y, 12x, 12y, and 13z, base plates 20a and 20b, a frame 21, a lift 30, and a controller 50.

The first holder 1 is configured to hold an upper surface of an article. The second holder 2 is configured to hold a side surface of the article. The article can be more stably held by both the first holder 1 and the second holder 2 holding the article. Or, even when another article is frontward of the article, only the article can be selectively held by only the first holder 1 holding the upper surface of the article.

Here, an X-direction (a longitudinal direction), a Y-direction (a lateral direction), and a Z-direction (a vertical direction) are used in the description. The Z-direction is parallel to a direction connecting the first holder 1 and the article when the first holder 1 holds the article. The X-direction is parallel to a direction connecting the second holder 2 and the article when the second holder 2 holds the article. The Z-direction crosses the X-direction. The Y-direction crosses a plane parallel to the X-direction and the Z-direction. For example, the X-direction and the Y-direction are parallel to a horizontal plane. The Z-direction is parallel to the vertical direction. The X-direction, the Y-direction, and the Z-direction are orthogonal to each other.

Figure 2:
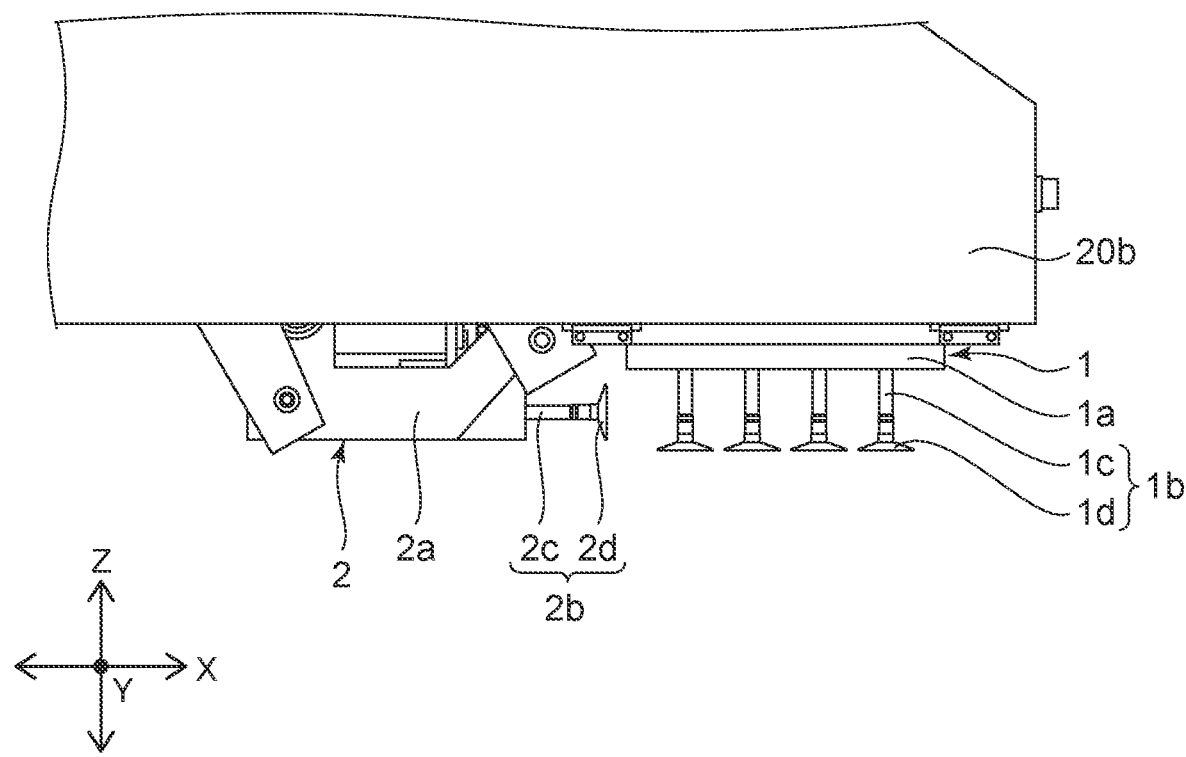
FIG. 2 is a side view illustrating a portion of the holding device according to the first embodiment.

FIG. 2 is a side view illustrating a portion of the holding device according to the first embodiment.

In the example of FIGS. 1 and 2, the first holder 1 and the second holder 2 hold (stably grip) an article by vacuum-gripping.

As illustrated in FIG. 2, the first holder 1 includes a housing 1a, and a gripping unit 1b that is mounted to the housing 1a. The housing 1a includes piping, valves, etc., necessary for vacuum-gripping. The gripping unit 1b includes a rod 1c and a suction pad 1d. The rod 1c extends in the Z-direction. The suction pad 1d is located at the tip of the rod 1c. The gripping surface of the tip of the suction pad 1d faces downward.

Similarly to the first holder 1, the second holder 2 includes a housing 2a, and a gripping unit 2b that is mounted to the housing 2a. The housing 2a includes piping, valves, etc., necessary for vacuum-gripping. The gripping unit 2b includes a rod 2c and a suction pad 2d. The rod 2c extends in the X-direction when the second holder 2 holds the article. The suction pad 2d is located at the tip of the rod 2c. The gripping surface of the tip of the suction pad 2d faces frontward when the second holder 2 holds the article.

The internal spaces of the gripping units 1b and 2b are connected to piping and valves located inside the housings 1a and 2a and to a not-illustrated exhaust system such as an exhaust device located outside the first holder 1 and the second holder 2, etc. The internal space of the gripping unit 1b can be exhausted independently of the internal space of the gripping unit 2b.

Pluralities of the gripping units 1b and 2b may be included. In the example of FIGS. 1 and 2, the first holder 1 includes multiple gripping units 1b arranged in two mutually-orthogonal directions. The second holder 2 includes multiple gripping units 2b arranged in one direction.

Figure 3:
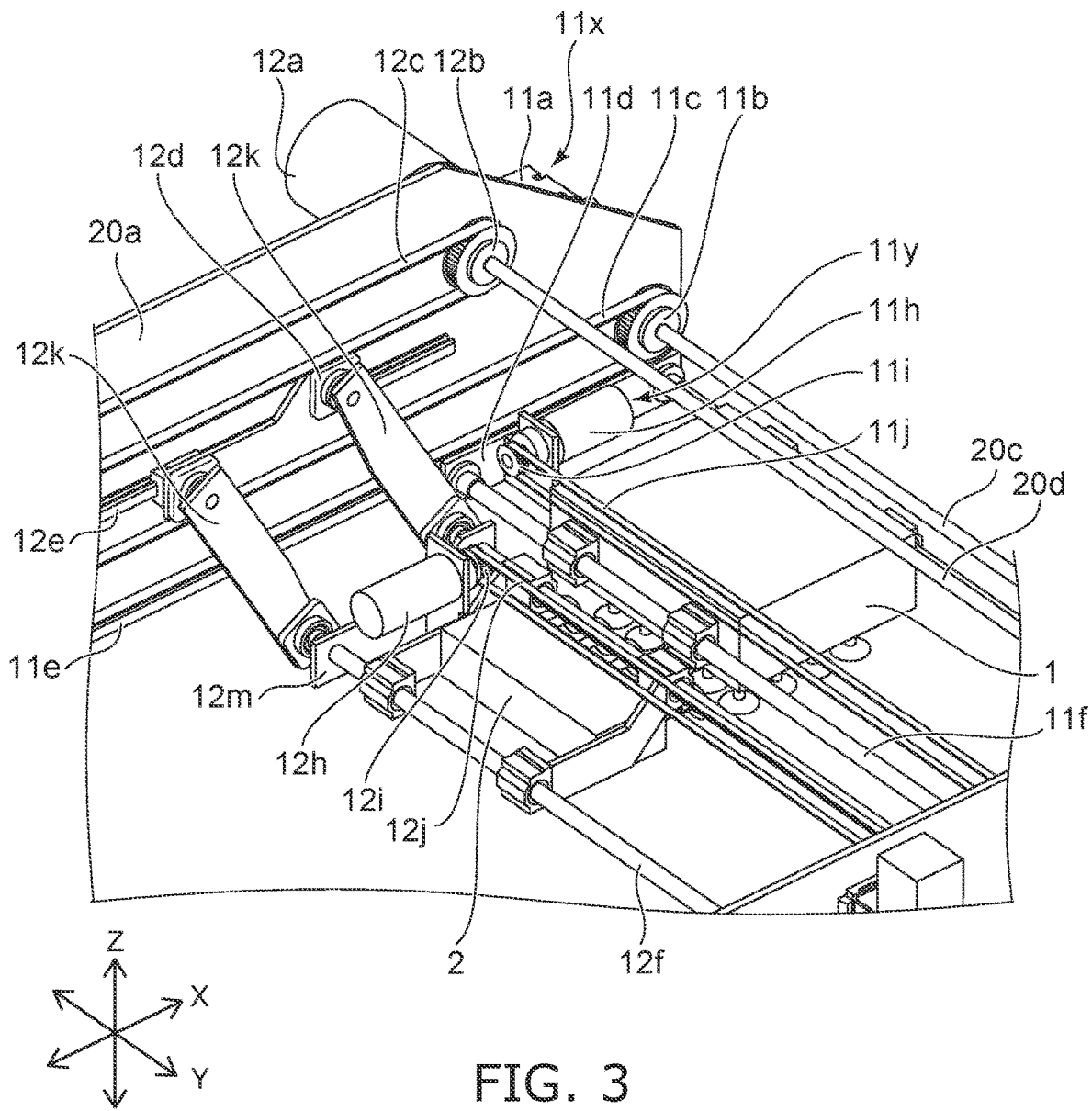
FIG. 3 is a perspective view illustrating a portion of the holding device according to the embodiment.

FIG. 3 is a perspective view illustrating a portion of the holding device according to the embodiment.

A driver 11x (an example of a first driver) moves the first holder 1 in the X-direction. A driver 11y moves the first holder 1 in the Y-direction.

For example, as illustrated in FIG. 3, the driver 11x includes an actuator 11a, a pulley 11b, a belt 11c, a bar 11d, and a guide 11e. In the example, the actuator 11a is a motor. The rotary shaft of the actuator 11a is parallel to the Y-direction. The rotary shaft of the actuator 11a is coupled to the pulley 11b. Another pulley 11b is positioned distant to the pulley 11b in the X-direction. The belt 11c is threaded over the pair of pulleys 11b. The bar 11d is fixed with respect to the belt 11c. The bar 11d engages the guide 11e that extends along the X-direction. The belt 11c is moved along the X-direction between the pair of pulleys 11b when the actuator 11a rotates the pulley 11b around the Y-direction. The bar 11d that is fixed with respect to the belt 11c moves in the X-direction along the guide 11e.

A rod 11f extends along the Y-direction and is fixed with respect to the bar 11d. In the example, a pair of rods 11f is separated from each other in the X-direction. The first holder 1 is coupled to each of the rods 11f. The rods 11f and the first holder 1 move in the X-direction according to the movement of the bar 11d.

The driver 11y moves in the X-direction together with the bar 11d. The driver 11y includes an actuator 11h, a pulley 11i, and a belt 11j. The actuator 11h is a motor. The rotary shaft of the actuator 11h is coupled to the pulley 11i. Another pulley 11i is positioned distant to the pulley 11i in the Y-direction. The belt 11j is threaded over the pair of pulleys 11i.

The first holder 1 is slidably coupled to the rod 11f in the Y-direction. The first holder 1 is fixed with respect to the belt 11j. The belt 11j is moved along the Y-direction between the pair of pulleys 11i when the actuator 11h rotates the pulley 11i. The first holder 1 that is fixed with respect to the belt 11j moves in the Y-direction.

A driver 12x (an example of a second driver) moves the second holder 2 in the X-direction. A driver 12y moves the second holder 2 in the Y-direction.

Figure 4:
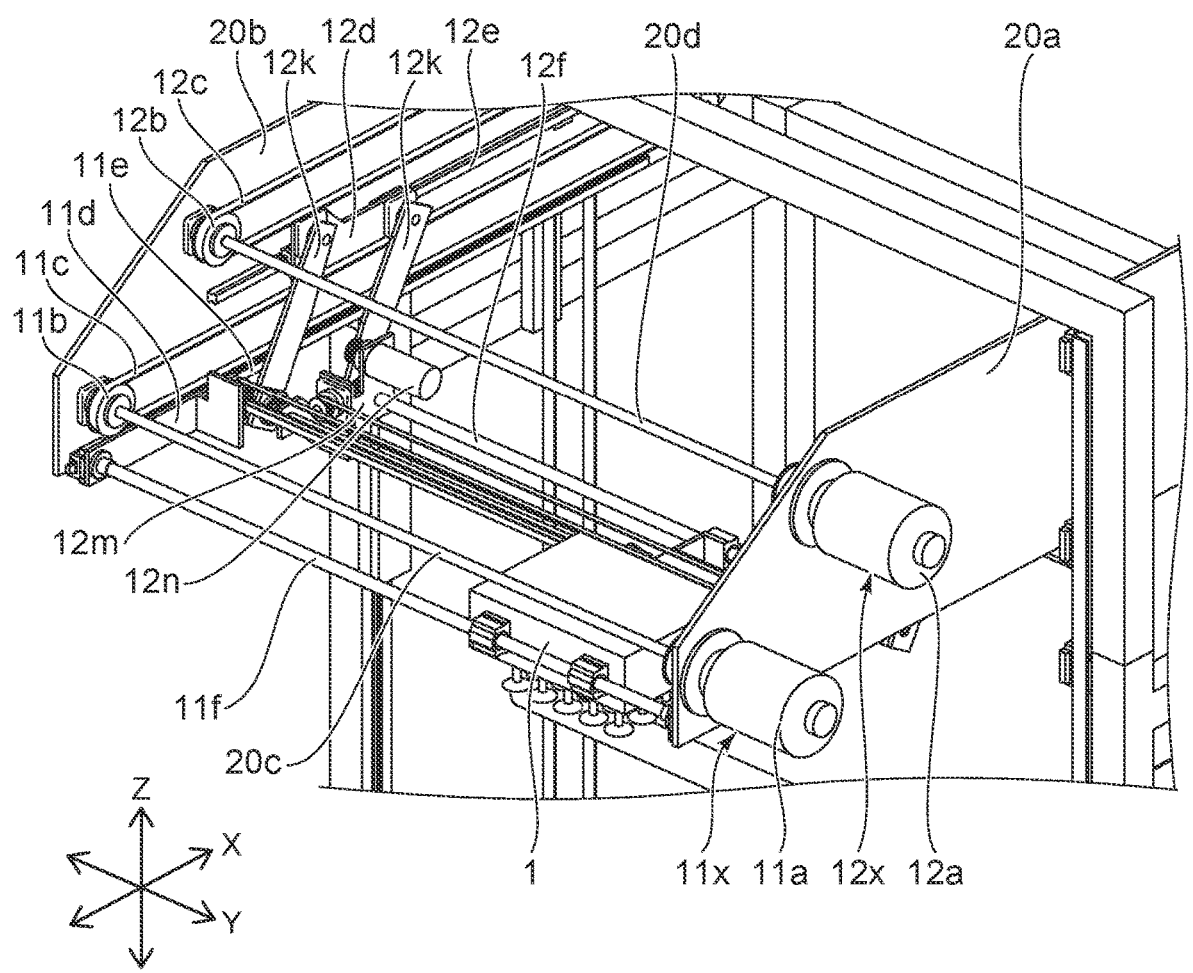
FIG. 4 is a perspective view illustrating a portion of the holding device according to the embodiment.

FIG. 4 is a perspective view illustrating a portion of the holding device according to the embodiment.

For example, as illustrated in FIGS. 3 and 4, the driver 12x is located higher than the driver 11x, and includes an actuator 12a, a pulley 12b, a belt 12c, a bar 12d, and a guide 12e. In the example, the actuator 12a is a motor. The rotary shaft of the actuator 12a is parallel to the Y-direction. The rotary shaft of the actuator 12a is coupled to the pulley 12b. Another pulley 12b is positioned distant to the pulley 12b in the X-direction. The belt 12c is threaded over the pair of pulleys 12b. The bar 12d is fixed with respect to the belt 12c. The bar 12d engages the guide 12e that extends along the X-direction. The belt 12c is moved along the X-direction between the pair of pulleys 12b when the actuator 12a rotates the pulley 12b around the Y-direction. The bar 12d that is fixed with respect to the belt 12c moves in the X-direction along the guide 12e.

One end of a link 12k is rotatably coupled to the bar 12d. A bar 12m is rotatably coupled to the other end of the link 12k. A rod 12f extends along the Y-direction and is fixed with respect to the bar 12m. In the example, a pair of rods 12f that is separated from each other in the X-direction is fixed with respect to the bar 12m. Each of the pair of links 12k that is separated from each other in the X-direction is rotatably coupled to the bar 12m. The link 12k, the bar 12m, the rod 12f, and the second holder 2 move in the X-direction according to the movement of the bar 11d.

The driver 12y moves in the X-direction together with the bar 12d. The driver 12y includes an actuator 12h (an example of a fourth driver), a pulley 12i, and a belt 12j. The actuator 12h is a motor. The rotary shaft of the actuator 12h is coupled to the pulley 12i. Another pulley 12i is positioned distant to the pulley 12i in the Y-direction. The belt 12j is threaded over the pair of pulleys 12i. The rotary shaft of the actuator 12h is parallel to the X-direction and is coupled to one of the pulleys 12i.

The second holder 2 is movably coupled to the rod 12f in the Y-direction. The second holder 2 is fixed with respect to the belt 12*j*. The belt 12*j* is moved along the Y-direction between the pair of pulleys 12*i* when the actuator 12*h* rotates the pulley 12*i*. The second holder 2 that is fixed with respect to the belt 12*j* moves in the Y-direction.

An actuator 12*n* is fixed with respect to one of the bars 12*m*. For example, the actuator 12*n* is a motor. The rotary shaft of the actuator 12*n* is parallel to the Y-direction and coupled to the other end of one of the links 12*k*. The link 12*k* is rotated with respect to the bar 12*m* by the driving of the actuator 12*n*. Thereby, the second holder 2 is rotated around the one end of the link 12*k*. The X-direction position and the Z-direction position of the second holder 2 are changed by the rotation of the second holder 2. For example, the second holder 2 rotates while maintaining the orientations of the suction pad 2*d* and the rod 2*c*.

The one end of the link 12*k* is positioned higher than the first holder 1. In other words, the rotation center of the second holder 2 is positioned higher than the first holder 1. The second holder 2 is switched between a state in which the second holder 2 is higher than the first holder 1 and a state in which the second holder 2 is lower than the first holder 1 by rotating the second holder 2 around its rotation center.

The base plates 20*a* and 20*b* are supporters for supporting the first holder 1 and the second holder 2. The base plate 20*a* (a first supporter) and the base plate 20*b* (a second supporter) are plate members that spread along the X-Z plane and are separated from each other in the Y-direction. The pulleys 11*b* and 12*b* are mounted to the base plate 20*a*. The base plates 20*a* and 20*b* support the first holder 1 via the pulley 11*b*, the belt 11*c*, the bar 11*d*, and the rod 11*f*. Also, the base plates 20*a* and 20*b* support the second holder 2 via the pulley 12*b*, the belt 12*c*, the bar 12*d*, the link 12*k*, the bar 12*m*, and the rod 12*f*.

The pulley 11*b*, the belt 11*c*, the bar 11*d*, the guide 11*e*, the pulley 12*b*, the belt 12*c*, the bar 12*d*, the guide 12*e*, the link 12*k*, and the bar 12*m* are mounted to each of the base plates 20*a* and 20*b* and are positioned between the base plates 20*a* and 20*b* when viewed along the Z-direction. The rod 11*f* is fixed to the bars 11*d* that face each other in the Y-direction. The rod 12*f* is fixed to the bars 12*d* that face each other in the Y-direction. The actuators 11*a* and 12*a* are mounted to the base plate 20*a*. The actuators 11*a* and 12*a* may be mounted to the base plate 20*b* or to both the base plates 20*a* and 20*b*.

The pulley 11*b* that is at the front of the base plate 20*a* and the pulley 11*b* that is at the front of the base plate 20*b* are coupled to each other by a rod 20*c* that extends in the Y-direction. The drive force of the actuator 11*a* mounted to the base plate 20*a* is transferred to the pulley 11*b* of the base plate 20*b* by the rod 20*c*. The pair of pulleys 11*b* of the base plate 20*b* rotate synchronously with the pair of pulleys 11*b* of the base plate 20*a*. Thereby, the bar 11*d* of the base plate 20*b* is moved in the X-direction synchronously with the bar 11*d* of the base plate 20*a*.

The pulley 12*b* that is at the front of the base plate 20*a* and the pulley 12*b* that is at the front of the base plate 20*b* are coupled to each other by a rod 20*d* that extends in the Y-direction. The drive force of the actuator 12*a* mounted to the base plate 20*a* is transferred to the pulley 12*b* of the base plate 20*b* by the rod 20*d*. The pair of pulleys 12*b* of the base plate 20*b* rotates synchronously with the pair of pulleys 12*b* of the base plate 20*a*. Thereby, the bar 12*m* of the base plate 20*b* is moved in the X-direction synchronously with the bar 12*m* of the base plate 20*a*.

The first holder 1 and the second holder 2 can be more stably supported by the rods 11*f* and 12*f* and the rods 20*c* and 20*d* bridging between the base plates 20*a* and 20*b*. For example, the positions in the Z-direction of the first and second holders 1 and 2 can be more stable.

As illustrated in FIG. 1, multiple drivers 13*z* (examples of the third driver) are arranged in the Y-direction. A pair of drivers 13*z* moves the base plates 20*a* and 20*b* in the Z-direction. The first holder 1 and the second holder 2 are moved in the Z-direction by the operation of the drivers 13*z*.

For example, each of the drivers 13*z* includes an actuator 13*a*, a pair of pulleys 13*b*, a belt 13*c*, a block 13*d*, and a guide 13*e*. The actuator 13*a* is a motor. The rotary shaft of the actuator 13*a* is parallel to the Y-direction. The rotary shaft of the actuator 13*a* is coupled to one of the pulleys 13*b*. The pair of pulleys 13*b* is separated from each other in the Z-direction. The belt 13*c* is threaded over the pair of pulleys 13*b*.

The blocks 13*d* are fixed respectively to the side surface of the base plate 20*a* and the side surface of the base plate 20*b*. The block 13*d* is fixed to the belt 13*c*. The base plates 20*a* and 20*b* respectively engage the guides 13*e*. By the rotation of the actuator 13*a*, the pulley 13*b* is rotated around the Y-direction, and the belt 13*c* is moved along the Z-direction between the pair of pulleys 13*b*. Thereby, the base plates 20*a* and 20*b* that are fixed with respect to the belts 13*c* are moved in the Z-direction.

The drivers 13*z* are mounted to the frame 21. The first holder 1 and the second holder 2 are movable in the X-direction, the Y-direction, and the Z-direction with respect to the frame 21 by the drivers 11*x*, 11*y*, 12*x*, 12*y*, and 13*z*.

For example, the frame 21 includes vertical frames 21*a* to 21*d* and horizontal frames 21*e* to 21*k*. The vertical frames 21*a* and 21*b* are separated from each other in the X-direction. The vertical frames 21*c* and 21*d* are separated from each other in the X-direction. The vertical frames 21*a* and 21*b* face the vertical frames 21*c* and 21*d* in the Y-direction. The horizontal frames 21*e* and 21*f* couple the lower ends of the vertical frames 21*a* and 21*b* to each other and couple the upper ends of the vertical frames 21*a* and 21*b* to each other. The horizontal frames 21*g* and 21*h* couple the lower ends of the vertical frames 21*c* and 21*d* to each other and couple the upper ends of the vertical frames 21*c* and 21*d* to each other. The horizontal frames 21*i* and 21*j* couple the lower ends of the vertical frames 21*b* and 21*d* to each other and couple the upper ends of the vertical frames 21*b* and 21*d* to each other. The horizontal frame 21*k* couples the upper ends of the vertical frames 21*a* and 21*c* to each other. The guides 13*e* are mounted respectively to the vertical frames 21*a* and 21*c*.

The lift 30 is located inside the frame 21. In other words, the lift 30 is the positioned inside a rectangular region surrounded with the vertical frames 21*a* to 21*d* when viewed along the Z-direction. The upper surface of the lift 30 is parallel to the X-direction and the Y-direction. The lift 30 is moved in the Z-direction by a not-illustrated driver.

As shown in FIG. 1, the lift 30 includes a pair of rollers 30*a* and a belt 30*b*. The pair of rollers 30*a* are separated from each other in the X-direction. The belt 30*b* is threaded over the pair of rollers 30*a*. The rotary shafts of the rollers 30*a* are parallel to the Y-direction. The belt 30*b* is moved along the X-direction between the pair of rollers 30*a* when a not-illustrated motor rotates the rollers 30*a*.

A conveyor C is located outside the frame 21. A driver of the lift 30 sets the lift 30 to a state in which the lift 30 is at the same level as the conveyor C, a state in which the lift 30 is at a lower position than the conveyor C, or a state in which the lift 30 is at a higher position than the conveyor C.

When a pallet P on which articles are loaded is placed in front of the holding device 100, the holding device 100 sequentially transfers the articles to the lift 30. The lift 30 is set to the same level as the conveyor C. Subsequently, the articles that are placed on the lift 30 are transferred onto the conveyor C. In other words, the holding device 100 functions as a cargo handling apparatus 100a that uses the first holder 1, the second holder 2, the lift 30, etc., to unload, onto the conveyor C, the articles loaded on the pallet P.

The holding device 100 may include a detector 35. The detector 35 detects the articles that are loaded on the pallet P. For example, the detector 35 detects the position of an article A. The detector 35 includes at least one selected from the group consisting of an image sensor, a through-beam sensor, a laser sensor, and an infrared sensor. Favorably, the detector 35 is a camera that includes an image sensor.

The controller 50 is connected with and controls the drivers, the exhaust device, and the detector 35 of the holding device 100. The controller 50 processes data necessary for holding and transferring the articles A. The controller 50 includes a processing circuit that includes a central processing unit, memory in which programs are stored, etc. The controller 50 may calculate the positions of the articles based on an image acquired by the detector 35.

Figure 5A:
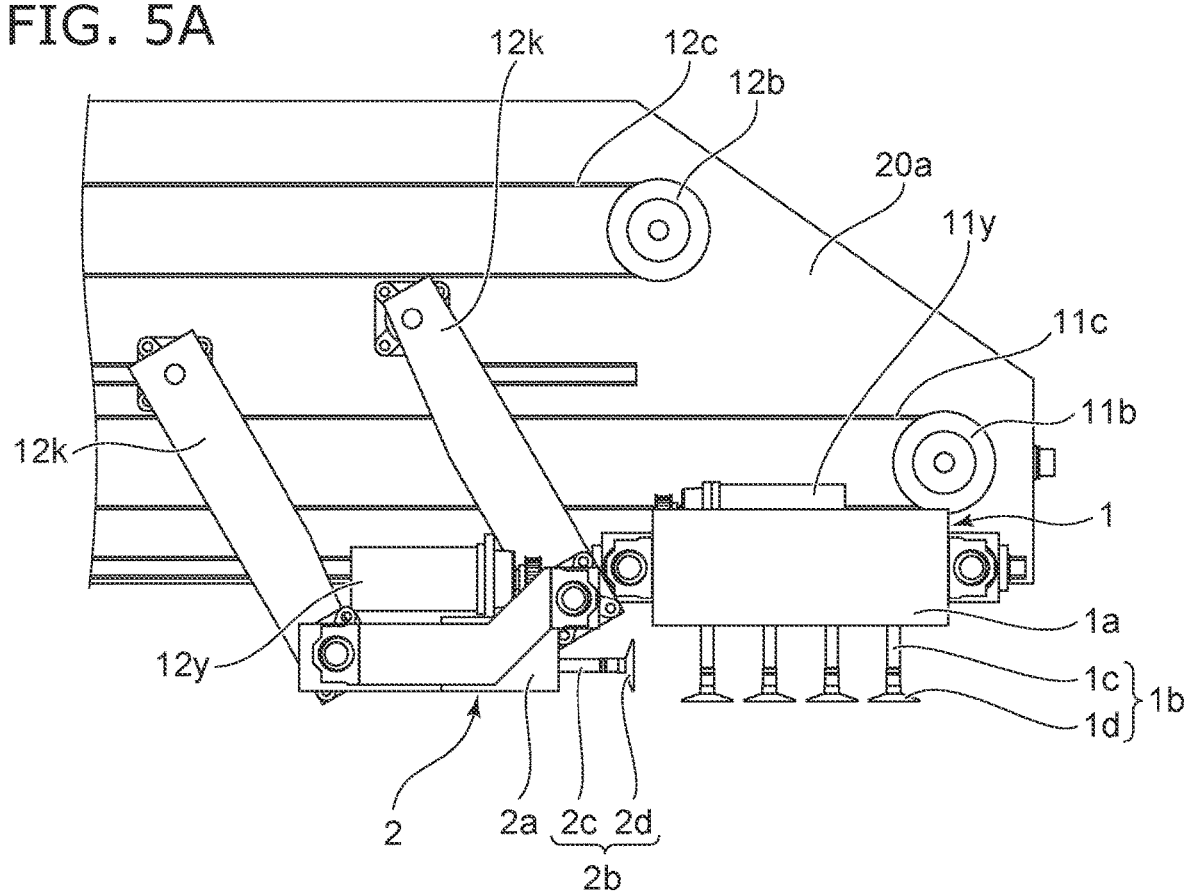
FIGS. 5A and 5B are side views illustrating a portion of the holding device according to the first embodiment.
Figure 5B:
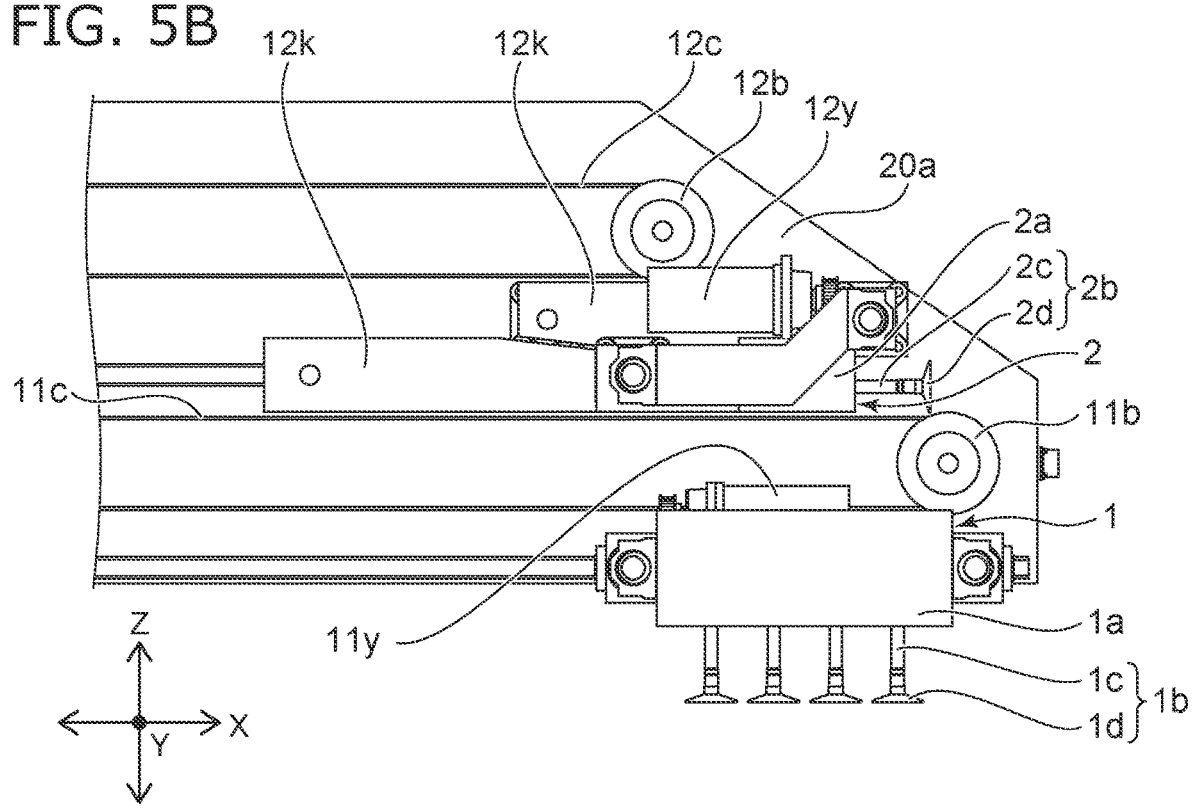

FIGS. 5A and 5B are side views illustrating a portion of the holding device according to the first embodiment.

The controller 50 switches between a first state in which the second holder 2 is at a first position and a second state in which the second holder 2 is at a second position.

The second holder 2 can hold the side surface of the article at the first position. The second holder 2 is positioned lower than at least a portion of the first holder 1 when the second holder 2 is at the first position. For example, the gripping unit 2b is positioned lower than the housing 1a and the upper end of the rod 1c of the first holder 1.

The second position is separated from the first position. For example, the second position is higher than the first position. The second holder 2 is positioned higher than at least a portion of the first holder 1 when the second holder 2 is at the second position. For example, the gripping unit 2b is positioned higher than the housing 1a and the gripping unit 1b of the first holder 1. When the actuator 12n operates, the link 12k is rotated, and the position of the second holder 2 is changed. The second holder 2 is movable between the first position and the second position by the actuator 12n.

FIG. 5A illustrates the state when the second holder 2 is at the first position. FIG. 5B illustrates the state when the second holder 2 is at the second position. As illustrated in FIG. 5A, at least a portion of the second holder 2 is at the same level as the first holder 1 when the second holder 2 is at the first position. As illustrated in FIG. 5B, the second holder 2 is positioned higher than the first holder 1 when the second holder 2 is at the second position. In the example, at least a portion of the second holder 2 is positioned directly above the first holder 1.

The holding device 100 performs the first operation when transferring articles of a first arrangement. The position of the second holder 2 is set to the first position in the first operation. The holding device 100 performs the second operation when transferring articles of a second arrangement. The position of the second holder 2 is set to the second position in the second operation. In the first arrangement, articles of substantially the same size are arranged in the X-direction and the Y-direction and loaded in the Z-direction. In the second arrangement, articles of different sizes are irregularly loaded.

FIGS. 6A to 6C, FIGS. 7A to 7C, FIG. 8A, and FIG. 8B are schematic views illustrating the first operation of the holding device according to the first embodiment.

FIG. 9A, FIG. 9B, FIG. 10A, FIG. 10B, FIG. 11A, FIG. 11B, FIG. 12A, and FIG. 12B are schematic views illustrating the second operation of the holding device according to the first embodiment.

Figure 6A:
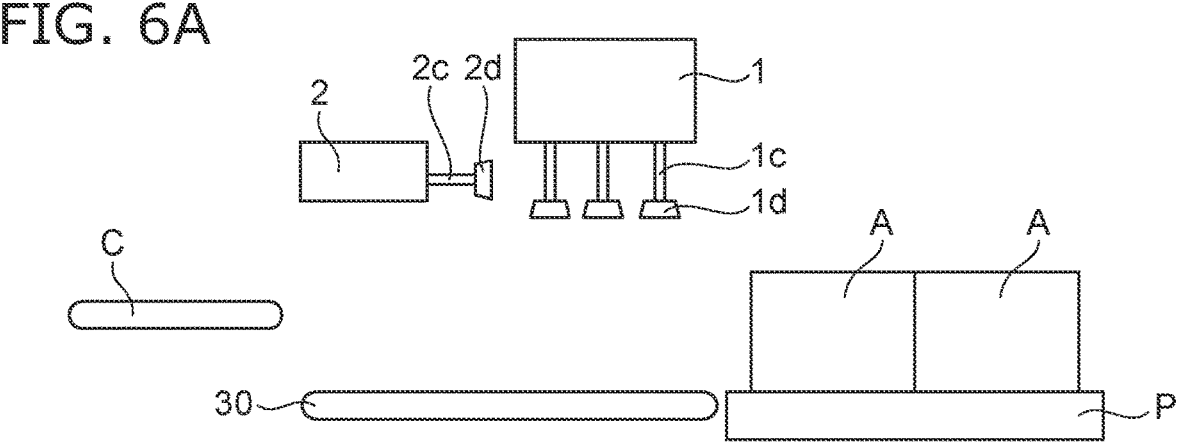
FIGS. 6A to 6C are schematic views illustrating the first operation of the holding device according to the first embodiment.

When transferring articles of the first arrangement, the holding device 100 sequentially transfers from the article positioned at the front. The controller 50 drives the actuator 12n to position the second holder 2 at the first position as illustrated in FIG. 6A. The controller 50 positions the upper surface of the lift 30 at the same level as the bottom surface of the article A to be transferred.

Figure 6B:
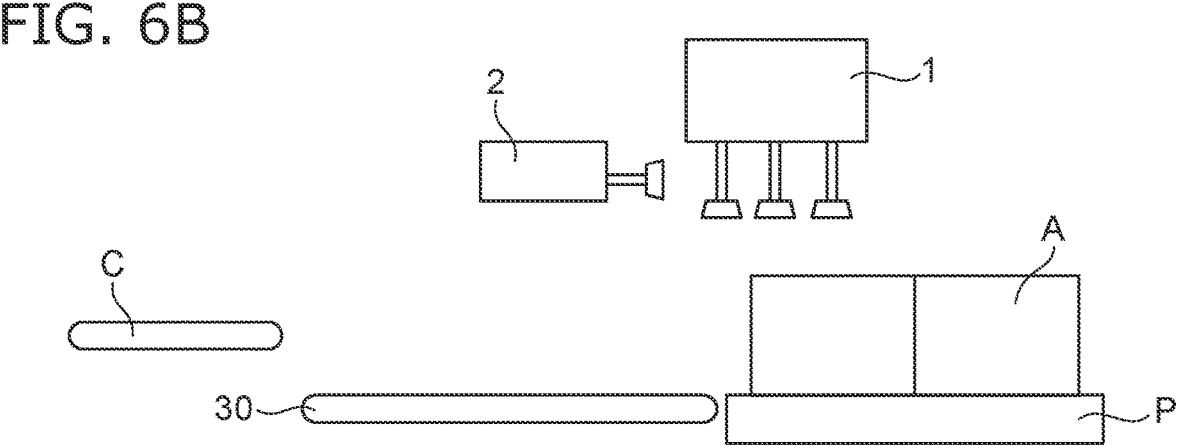
Figure 6C:
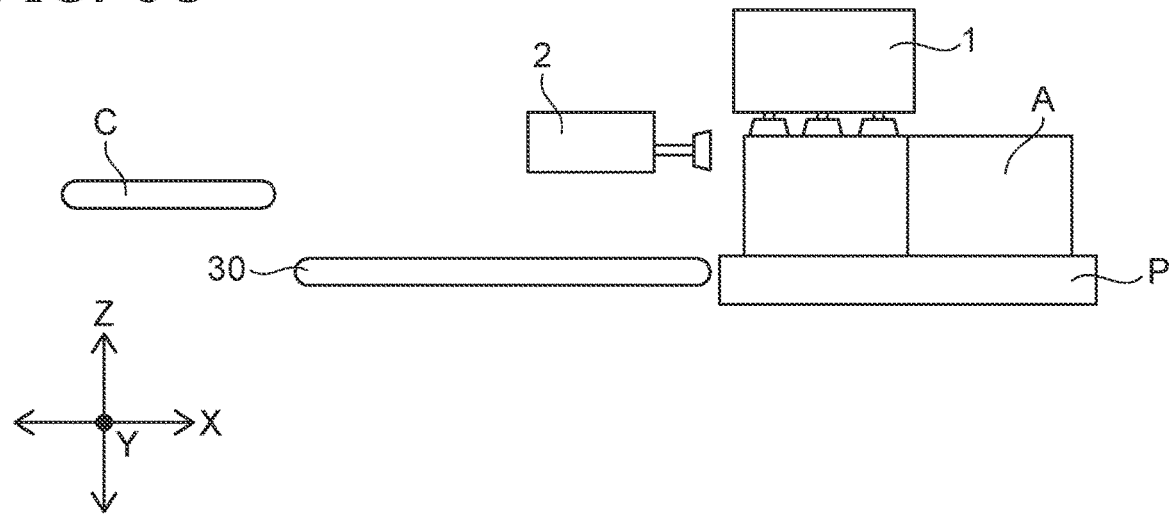

The controller 50 drives the drivers 11x and 11y to move the first holder 1 directly above the article A as illustrated in FIG. 6B. The controller 50 drives the driver 13z to press the first holder 1 onto the upper surface of the article A as illustrated in FIG. 6C. Each rod 1c is displaced, and the suction pad 1d deforms according to the shape of the upper surface. The controller 50 operates the exhaust system to set the internal pressure of the gripping unit 1b to be less than atmospheric pressure. Thereby, the first holder 1 holds the upper surface of the article A.

Figure 7A:
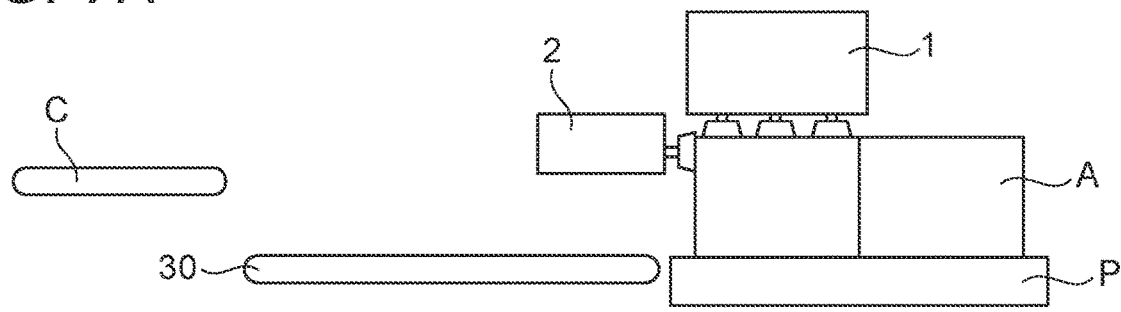
FIGS. 7A to 7C are schematic views illustrating the first operation of the holding device according to the first embodiment.

The controller 50 drives the drivers 12x and 12y to press the second holder 2 onto the side surface of the article A as illustrated in FIG. 7A. Each rod 2c is displaced, and the suction pad 2d deforms according to the shape of the side surface. The controller 50 operates the exhaust system to set the internal pressure of the gripping unit 2b to be less than atmospheric pressure. Thereby, the second holder 2 holds the side surface of the article A.

Figure 7B:
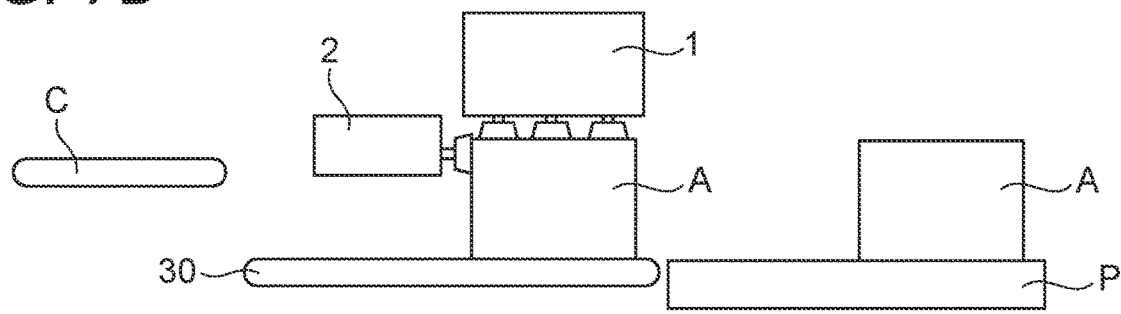
Figure 7C:
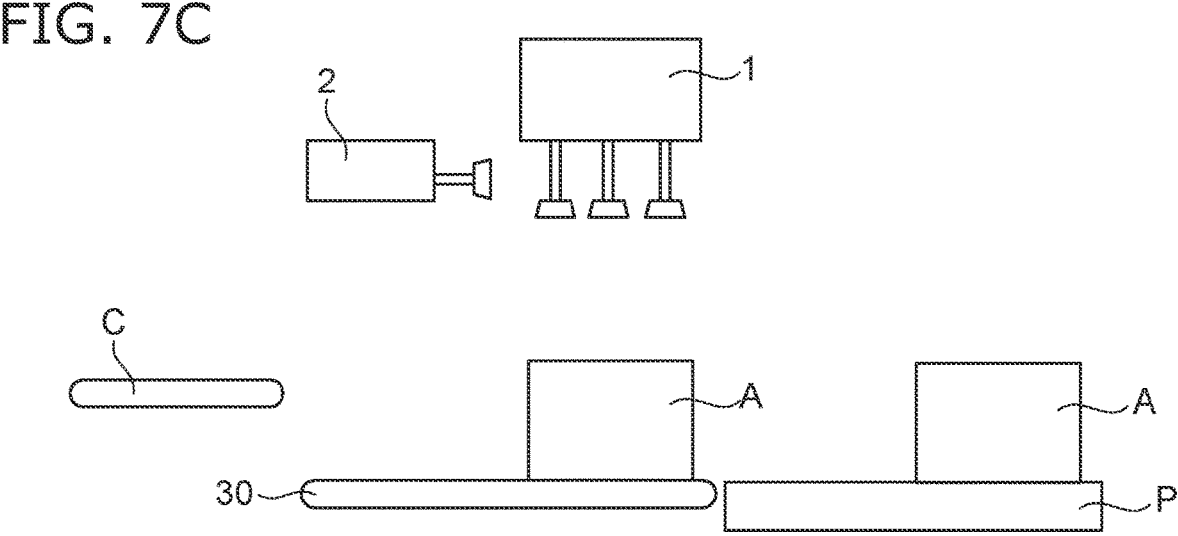

As illustrated in FIG. 7B, the controller 50 operates the drivers 11x and 12x to transfer the article A from the pallet P onto the lift 30. At this time, the controller 50 may operate the driver 13z to lift the article A. When the article A is transferred onto the lift 30, the controller 50 releases the holding by the first and second holders 1 and 2. Namely, the controller 50 increases the pressure of the internal space of the gripping unit 1b and the pressure of the internal space of the gripping unit 2b and weakens the gripping force of the first and second holders 1 and 2. The controller 50 operates the drivers 12x and 13z to separate the first and second holders 1 and 2 from the article A as illustrated in FIG. 7C.

Figure 8A:
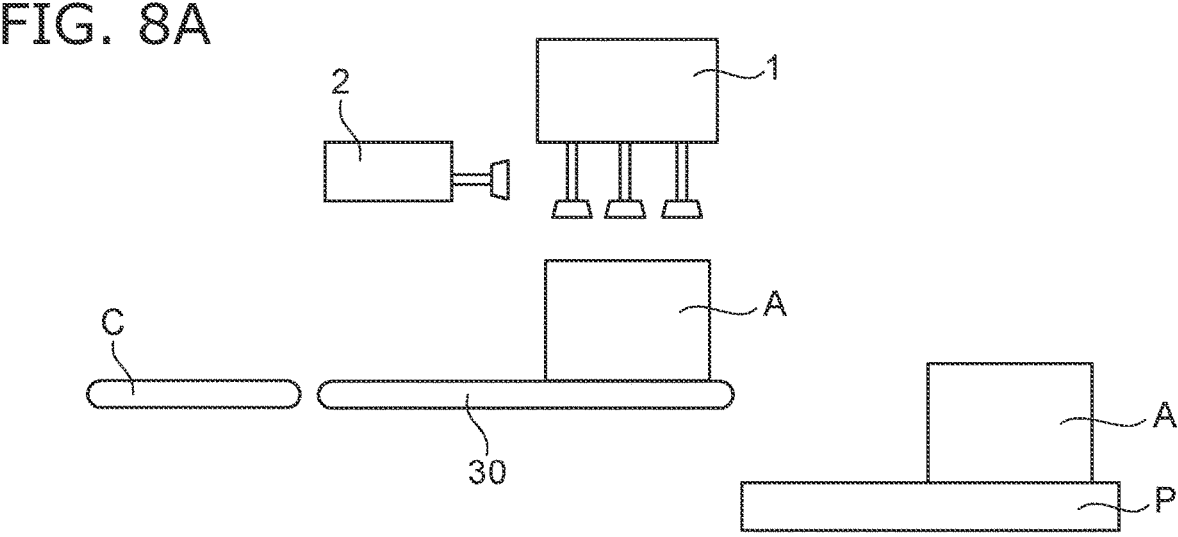
FIGS. 8A and 8B are schematic views illustrating the first operation of the holding device according to the first embodiment.
Figure 8B:
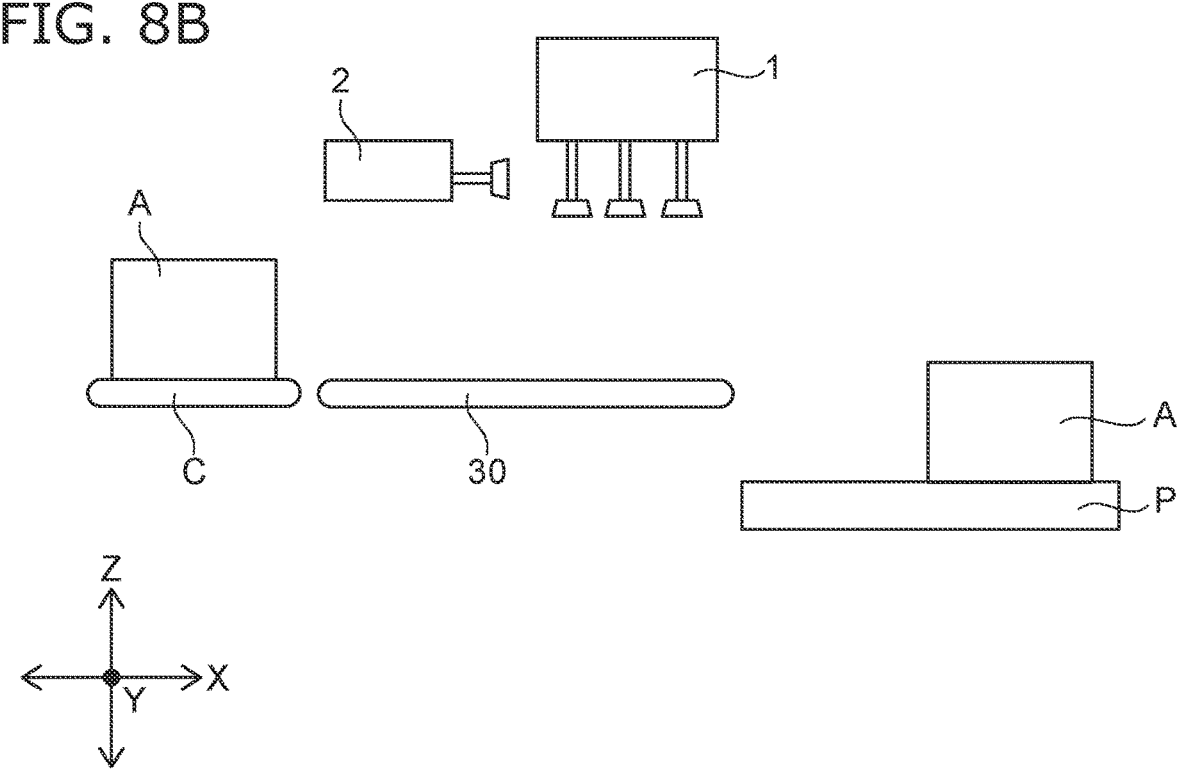

As illustrated in FIG. 8A, the controller 50 positions the upper surface of the lift 30 at the same level as the upper surface of the conveyor C. As illustrated in FIG. 8B, the lift 30 is operated to transfer the article A onto the conveyor C. The conveyor C transfers the article A to another location. The holding device 100 repeats the first operation illustrated in FIGS. 6A to 8B until all of the articles A placed on the pallet P are transferred onto the conveyor C.

When transferring articles of the second arrangement, the holding device 100 sequentially transfers from an article that is at a high position. As illustrated in FIG. 9A, the controller 50 drives the actuator 12n to position the second holder 2 at the second position. At this time, the controller 50 may position the upper surface of the lift 30 at the same level as the bottom surface of the article A to be transferred. The controller 50 drives the drivers 11x and 11y to move the first holder 1 directly above the article A that is the transfer object as illustrated in FIG. 9B.

The transfer object is, for example, the article A of which the upper surface is at the highest position. When the first holder 1 approaches an article A of which the upper surface is at a low position, a portion of the holding device 100 interferes with the articles A of which the upper surfaces are at higher positions, and there is a possibility that the article A cannot be transferred. The transfer object may be determined by a user of the holding device 100. The positions of the upper surfaces of the articles A may be calculated based on the detection result of the detector 35. The controller 50 determines the article A to be transferred based on the calculated positions of the upper surfaces.

The controller 50 drives the driver 13*z* to press the first holder 1 onto the upper surface of the article A as illustrated in FIG. 10A. The controller 50 operates the exhaust system to set the internal pressure of the gripping unit 1*b* to be less than atmospheric pressure. Thereby, the first holder 1 holds the upper surface of the article A. The controller 50 operates the driver 13*z* to lift the article A as illustrated in FIG. 10B. At this time, the second holder 2 is still at the second position. The second holder 2 does not hold the article A.

The controller 50 operates the drivers 11*x* and 12*x* to transfer the article A from the pallet P onto the lift 30. The controller 50 operates the driver 13*z* to place the article A onto the lift 30 as illustrated in FIG. 11A. The controller 50 releases the holding by the first holder 1. The controller 50 operates the driver 13*z* to separate the first and second holders 1 and 2 from the article A as illustrated in FIG. 11B.

Figure 12A:
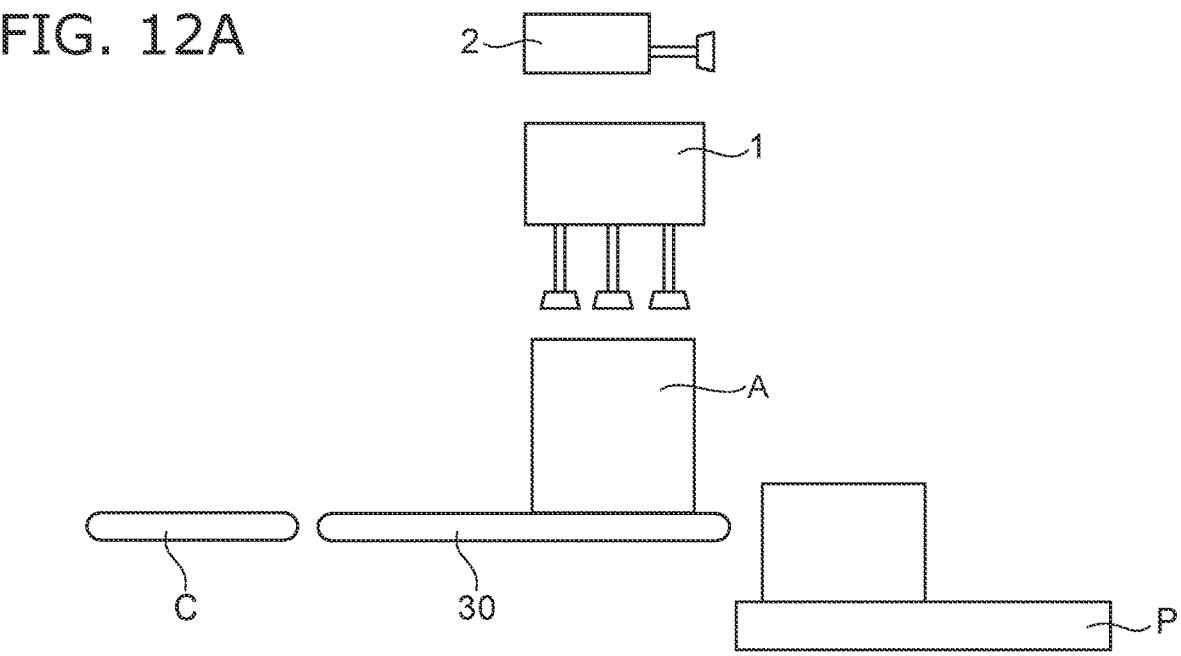
FIGS. 12A and 12B are schematic views illustrating the second operation of the holding device according to the first embodiment.
Figure 12B:
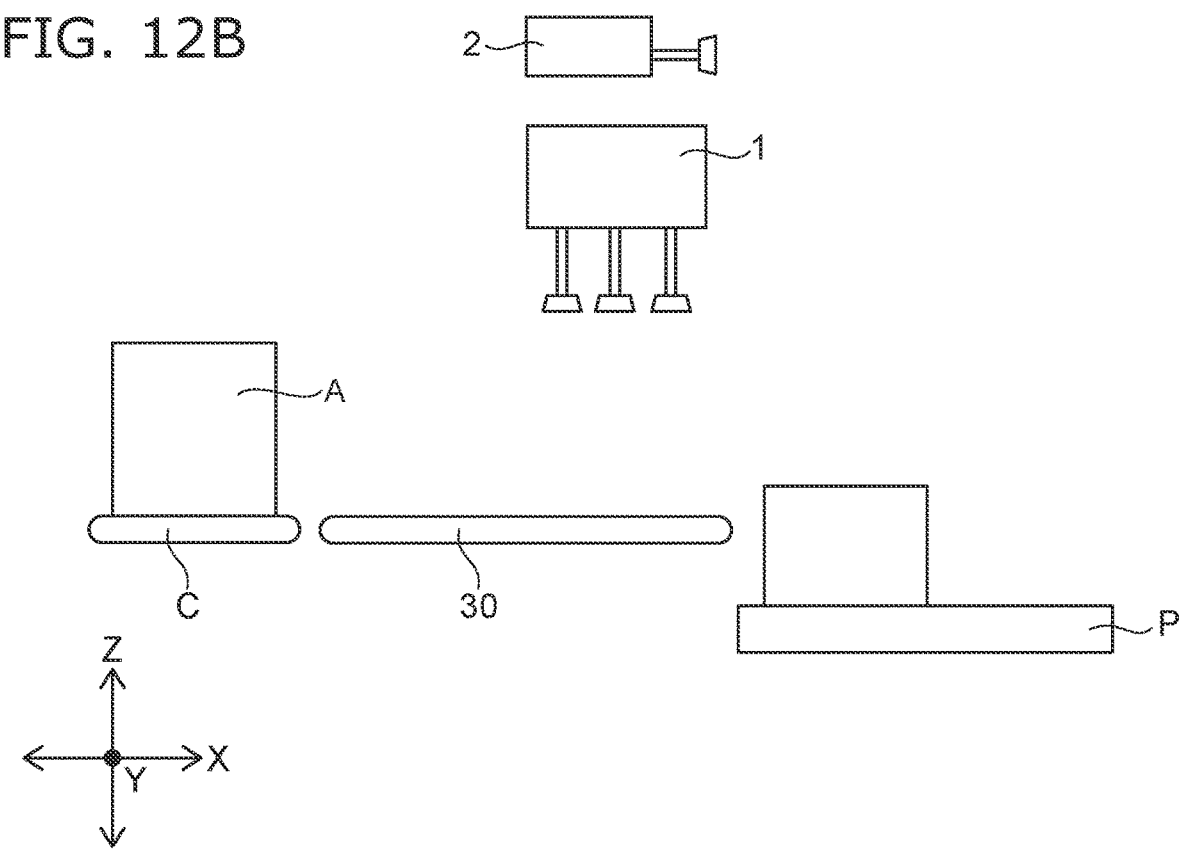

As illustrated in FIG. 12A, the controller 50 positions the upper surface of the lift 30 at the same level as the upper surface of the conveyor C. As illustrated in FIG. 12B, the lift 30 is operated to transfer the article A onto the conveyor C. The conveyor C transfers the article A to another location. The holding device 100 repeats the second operation illustrated in FIGS. 9A to 12B until all of the articles A placed on the pallet P are transferred onto the conveyor C.

Data of the arrangement of the articles A on the pallet P may be input by the user or may be transmitted to the controller 50 by a communicator. For example, the controller 50 receives the data of the arrangement. The controller 50 switches the position of the second holder 2 based on the received data.

Advantages of the first embodiment will now be described.

When the multiple articles A are loaded in the regular first arrangement, the heights of the articles A are the same as those illustrated in FIG. 6A. For example, products of the same product type are packaged in each article A. In such a case, the article A can be more stably held by both the first holder 1 and the second holder 2 by transferring the article A at the front first. Compared to when the article A is held by only one of the first holder 1 or the second holder 2, the application of a locally-large force to the article A can be suppressed. The likelihood of damaging the article A can be reduced thereby. Both the first holder 1 and the second holder 2 are used for the articles A of the first arrangement.

When the multiple articles A are loaded at the irregular second arrangement, the sizes of the articles A are different from each other as illustrated in FIG. 9A. For example, the articles A are courier parcels. In such a case, when the first holder 1 approaches an article A of which the upper surface is at a low position, a portion of the holding device 100 interferes with other articles A of which the upper surfaces are at higher positions, and there is a possibility that the other articles A may be damaged. Therefore, the holding device 100 holds the article A of which the upper surface is at the highest position when transferring. For the articles A of the second arrangement, only the first holder 1 is used, and the second holder 2 is not used.

Conventionally, different holding devices are used between when transferring the articles A of the first arrangement illustrated in FIG. 6A and when transferring the articles A of the second arrangement illustrated in FIG. 9A. In other words, a holding device that includes the first and second holders 1 and 2 is used for the articles A of the first arrangement. A holding device that includes only the first holder 1 is used for the articles A of the second arrangement. However, in a conventional method, it is necessary to assign the pallets to the holding devices according to the type of the holding device and the arrangement of the articles. Therefore, management is complex. Also, the operation rate of the holding device may decrease.

For this problem, the holding device 100 according to the first embodiment performs the first operation of holding the article A with both the first holder 1 and the second holder 2, and the second operation of holding the article A with only the first holder 1. By selectively performing one of the first operation or the second operation, the article A can be held regardless of the arrangement. According to the first embodiment, the convenience of the holding device 100 can be improved. For example, the operation rate of the holding device 100 can be improved thereby.

Favorably, the holding device 100 switches between the first state in which the second holder 2 is at the first position and the second state in which the second holder 2 is at the second position. When holding the articles A of the second arrangement, there is a possibility that the second holder 2 may interfere with an article A other than the holding object. When the second holder 2 is at the second position in the second operation, the likelihood of the second holder 2 interfering with the other article A can be reduced.

More favorably, the second position is higher than the first holder 1. The likelihood of the second holder 2 interfering with the other article A in the second operation can be further reduced thereby.

More favorably, at least a portion of the second holder 2 is positioned directly above the first holder 1 when the second holder 2 is at the second position. The likelihood of the second holder 2 interfering with the other article A in the second operation can be further reduced thereby.

Favorably, the distance in the Y-direction between the base plate 20*a* and the base plate 20*b* is greater than the length in the Y-direction of the lift 30. The lift 30 is positioned between the base plate 20*a* and the base plate 20*b* when viewed along the Z-direction. Therefore, the interference of the lift 30 with the base plates 20*a* and 20*b* when the base plates 20*a* and 20*b* are moved in the Z-direction or when the lift 30 is moved in the Z-direction can be suppressed.

The first holder 1 and the second holder 2 are movable to a position that does not interfere with the lift 30 when the lift 30 moves to be higher than the first holder 1. The interference of the lift 30 with the first holder 1, the second holder 2, the base plate 20*a*, and the base plate 20*b* can be suppressed thereby, and the operation rate of the holding device 100 can be improved.

Specifically, in the holding device 100, the first holder 1 and the second holder 2 are movable further frontward than the lift 30. The first holder 1 and the second holder 2 do not overlap the lift 30 when viewed along the Z-direction. For example, when only the first holder 1 holds the article A as illustrated in FIGS. 9B to 10B, the first holder 1 and the second holder 2 can be moved in the Z-direction regardless of the Z-direction position of the lift 30.

First Modification

In the holding device according to the first embodiment, the second holder 2 may be fixed with respect to the bar 12*d*. For example, the two ends of the link 12*k* are fixed respectively to the bars 12*d* and 12*m*. The actuator 12*n* is not included.

Figure 13:
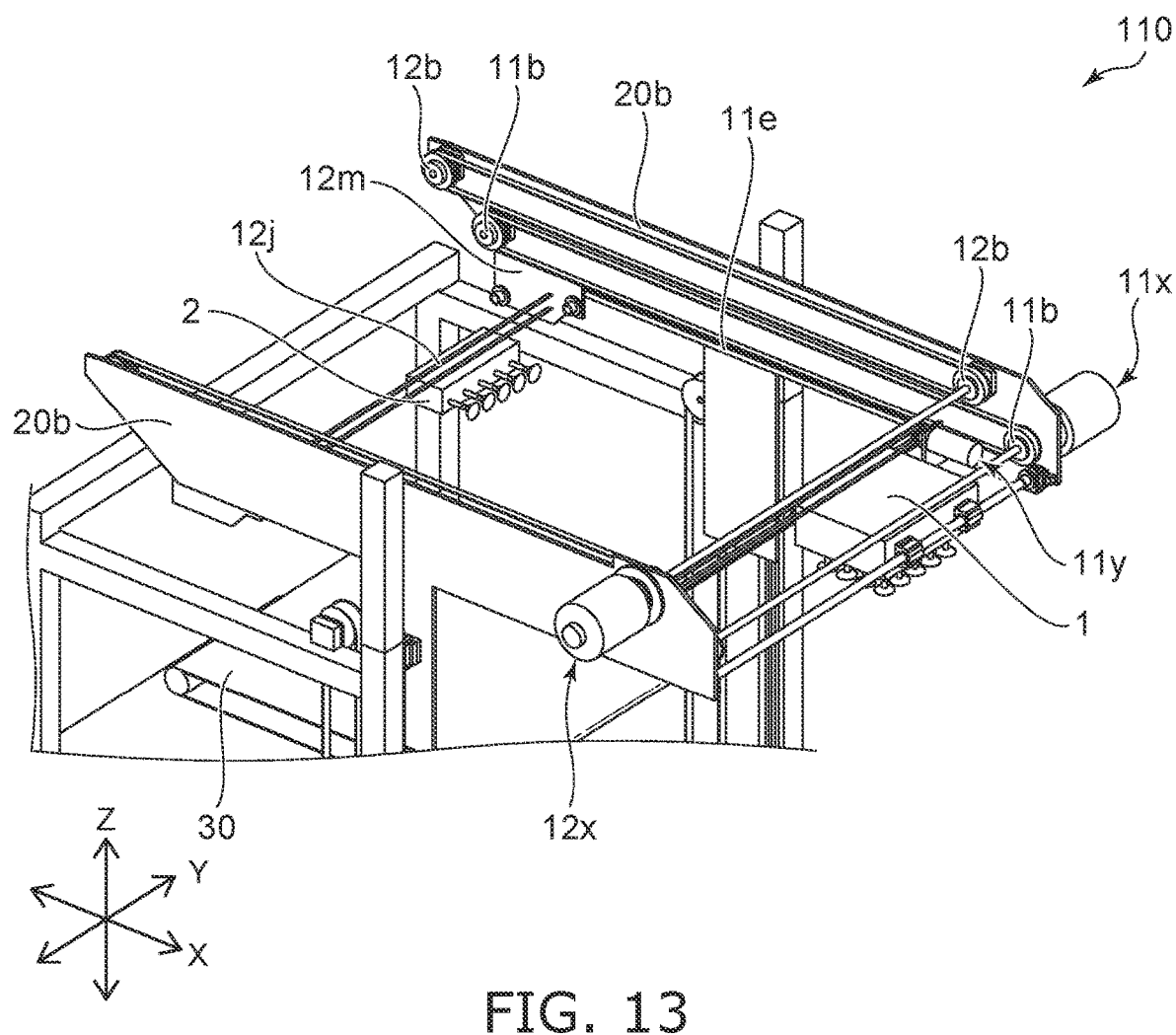
FIG. 13 is a perspective view illustrating a portion of a holding device according to a first modification of the first embodiment.

FIG. 13 is a perspective view illustrating a portion of a holding device according to a first modification of the first embodiment.

Parts of the holding device 110 such as the bar 12d, the guide 12e, the pulley 12i, the link 12k, etc., are not illustrated in FIG. 13. In the holding device 100, the second holder 2 is movable by the actuator 12n in the Z-direction with respect to the first holder 1. Conversely, in the holding device 110 according to the first modification, the second holder 2 is movable only in the X-direction or the Y-direction with respect to the first holder 1.

The controller 50 switches between the first state in which the second holder 2 is at the first position and the second state in which the second holder 2 is at the second position. The second holder 2 can hold the side surface of the article at the first position. The second position is further backward of the first position and is at the same level as the first position. For example, the second position is directly above the lift 30.

When the first operation is performed, the first holder 1 moves to the first position at the front. When the second operation is performed, the second holder 2 withdraws to the second position at the back as illustrated in FIG. 13. According to the first modification, similarly to the holding device 100, the article A can be held regardless of the arrangement. Therefore, the convenience of the holding device 110 can be improved.

Second Modification

FIGS. 14A and 14B are perspective views illustrating the first and second holders of a holding device according to a second modification of the first embodiment.

In the holding device according to the first embodiment, the second holder 2 may be coupled to the first holder 1. In the holding device 120 according to the second modification, the second holder 2 is detachably coupled to the first holder 1. FIG. 14A illustrates a state when the second holder 2 is coupled to the first holder 1. FIG. 14B illustrates a state when the second holder 2 is separated from the first holder 1.

A coupler 15 is included in the first and second holders 1 and 2. The coupler 15 couples the first holder 1 and the second holder 2. The coupler 15 includes a first coupling part 15a and a second coupling part 15b. The first coupling part 15a and the second coupling part 15b are mounted respectively to the first and second holders 1 and 2. In the example, the first coupling part 15a and the second coupling part 15b are coupled by a magnetic force. The first coupling part 15a and the second coupling part 15b may be mechanically coupled.

The first coupling part 15a includes an electromagnet. A current is supplied to the first coupling part 15a via the first holder 1. A magnetic field is generated at the periphery of the first coupling part 15a when electrical power is supplied to the first coupling part 15a. Thereby, as illustrated in FIG. 14A, the first coupling part 15a and the second coupling part 15b are coupled by a gripping force.

The second coupling part 15b is mounted to the second holder 2 via an actuator 15c (an example of a second driver). In the example, the actuator 15c is a power cylinder. The actuator 15c extends and retracts along the X-direction. The actuator 15c functions as a driver that moves the second holder 2 in the X-direction with respect to the first holder 1.

The first coupling part 15a and the second coupling part 15b are separable when the supply of the current to the first coupling part 15a is stopped. The second holder 2 is separated from the first holder 1 by moving the first holder 1 in the state in which the coupling is released.

Figure 15:
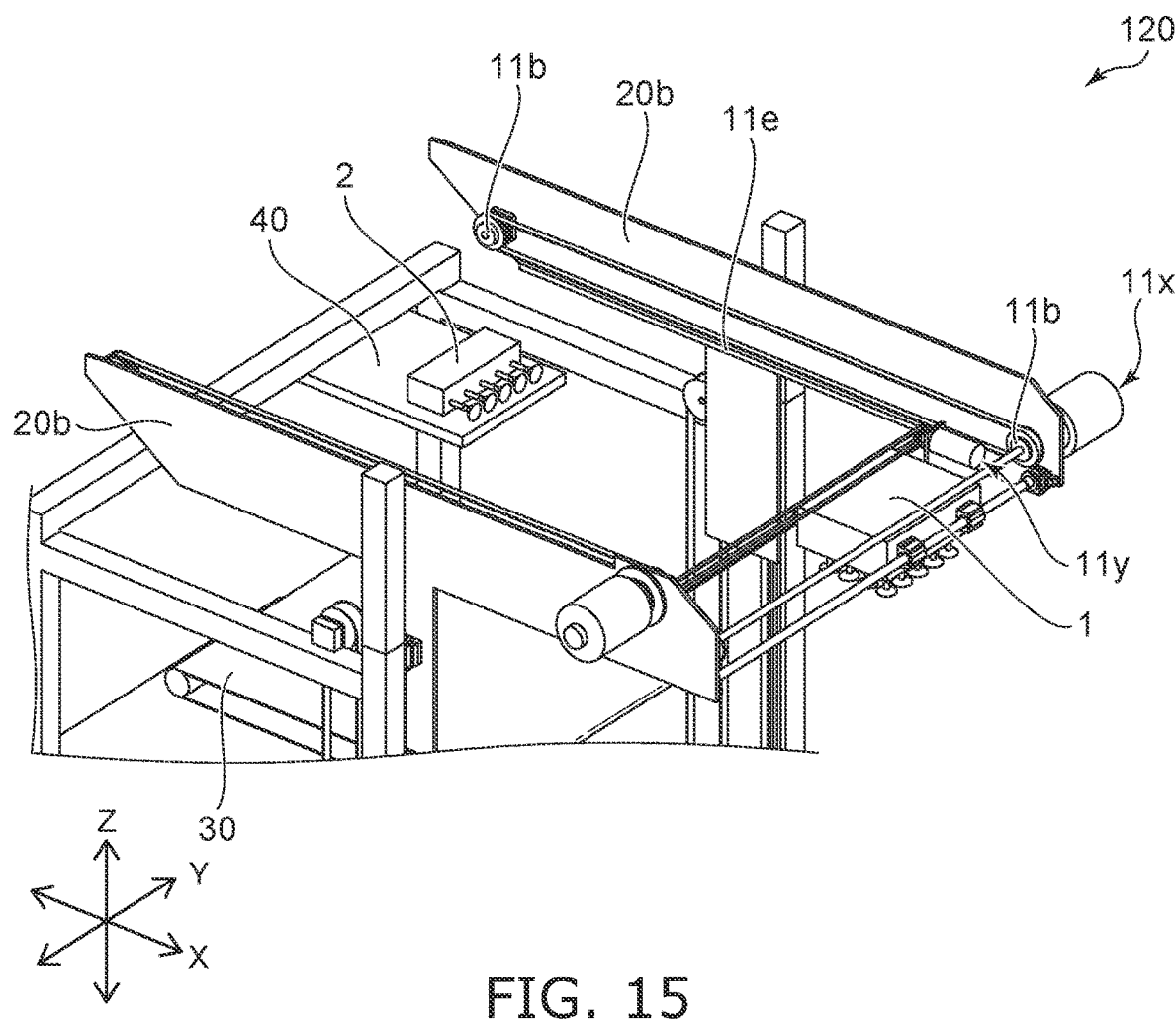
FIG. 15 is a perspective view illustrating a portion of a holding device according to a second modification of the first embodiment.

FIG. 15 is a perspective view illustrating a portion of a holding device according to a second modification of the first embodiment.

For example, the holding device 120 according to the second modification includes a placement platform 40. The placement platform 40 is located at a position that does not interfere with the first and second holders 1 and 2 when the holding device 120 transfers the article. The placement platform 40 is located at a position that does not interfere with the lift 30 when the lift 30 moves in the Z-direction. For example, the placement platform 40 is located higher than the range of movement of the lift 30 in the Z-direction.

When performing the first operation, the second holder 2 is coupled to the first holder 1. When performing the second operation, the second holder 2 is placed on the placement platform 40. In other words, the state in which the second holder 2 is coupled to the first holder 1 corresponds to the first state. The state in which the second holder 2 is placed on the placement platform 40 corresponds to the second state. The second position is on the placement platform 40. The first holder 1 holds the article at a lower position than the second position.

When the second operation is performed after performing the first operation, the drivers 11x and 11y move the first holder 1 and the second holder 2 so that the second holder 2 is positioned on the placement platform 40. The second holder 2 is placed on the placement platform 40 by releasing the coupling of the coupler 15. Subsequently, the second operation is performed using the first holder 1.

According to the second modification, similarly to the holding device 100, the convenience of the holding device 120 can be improved. Furthermore, the interference of the second holder 2 with the article can be avoided by placing the second holder 2 on the placement platform 40 in the second operation. The operation rate of the holding device 120 can be improved by providing the placement platform 40 at a position that does not interfere with the other components (e.g., the lift 30).

Third Modification

Figure 16A:
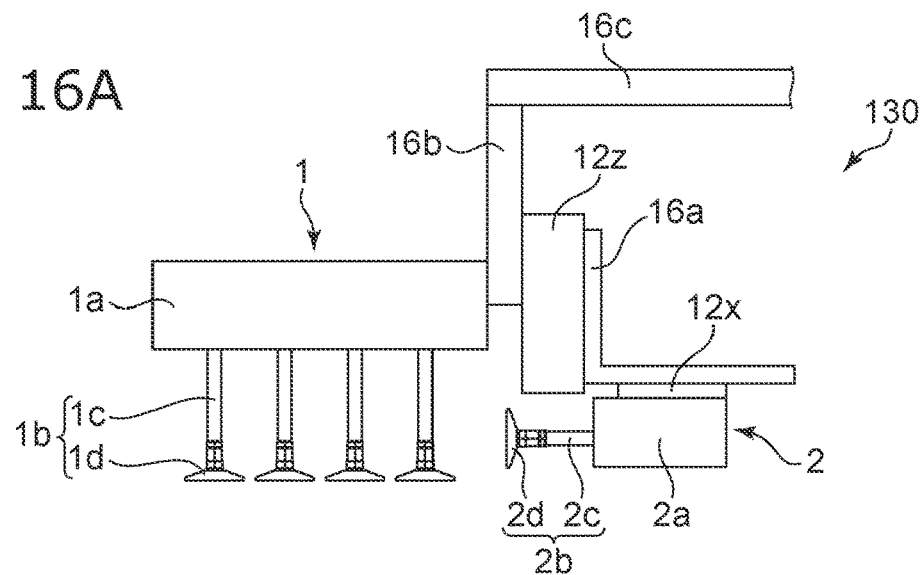
FIGS. 16A to 16C are side views schematically illustrating a first holder and a second holder of a holding device according to a third modification of the embodiment.
Figure 16B:
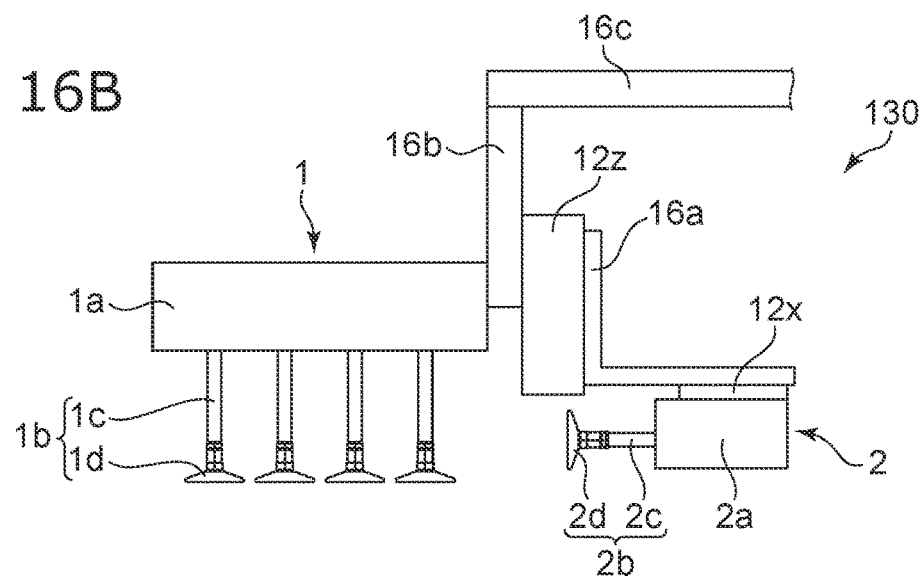
Figure 16C:
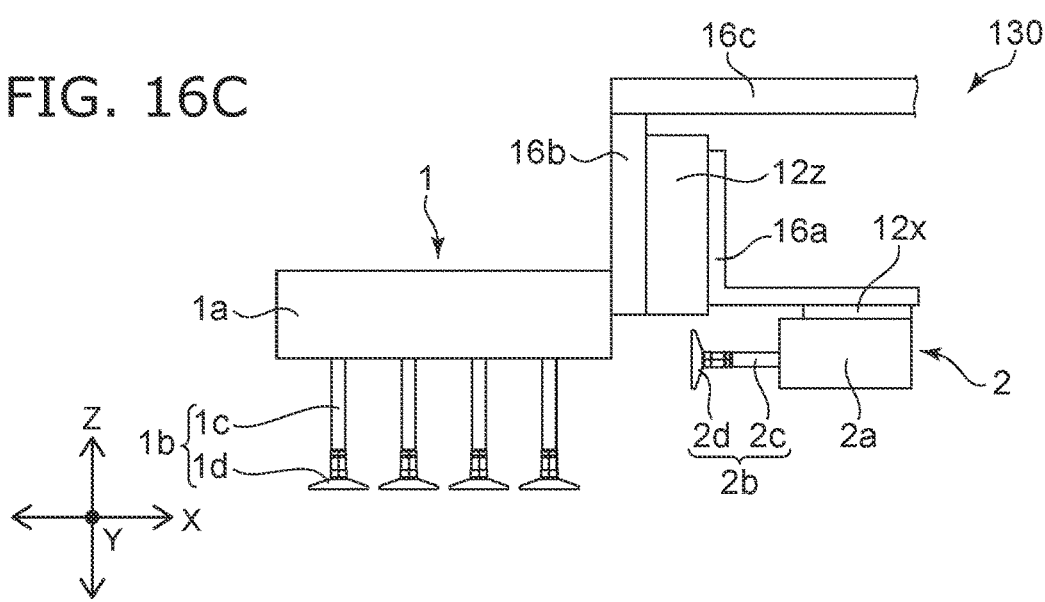

FIGS. 16A to 16C are side views schematically illustrating a first holder and a second holder of a holding device according to a third modification of the embodiment.

In the holding device 130 according to the third modification, the second holder 2 is coupled to the first holder 1. The driver 12x moves the second holder 2 in the X-direction with respect to the first holder 1. A driver 12z moves the second holder 2 in the Z-direction with respect to the first holder 1.

For example, the second holder 2 is coupled to a coupling part 16a via the driver 12x. The coupling part 16a is coupled to a support frame 16b via the driver 12z. The first holder 1 is fixed with respect to the support frame 16b. The support frame 16b is fixed with respect to an arm 16c. For example, the arm 16c is movable in the X-direction and the Y-direction by the drivers 11x and 11y. Or, the arm 16c may be a portion of an X-Y orthogonal robot. The arm 16c may be a portion of an arm of a vertical articulated robot or a horizontal articulated robot.

FIG. 16A illustrates the first state in which the second holder 2 is at the first position. When the second holder 2 moves from the first position to the second position, the driver 12x moves the second holder 2 backward as illustrated in FIG. 16B. Then, as illustrated in FIG. 16C, the driver 12z moves the second holder 2 upward. Thereby, the second holder 2 is positioned higher than at least a portion of the first holder 1 (the suction pad 1d). FIG. 16C illustrates the second state in which the second holder 2 is at the second position. The holding device 130 performs the first operation of transferring the articles of the first arrangement in the first state illustrated in FIG. 16A. The holding device 130 performs the second operation of transferring the articles of the second arrangement in the second state illustrated in FIG. 16C.

When the second holder 2 is at the first position, the gripping unit 2b is positioned lower than the housing 1a and the upper end of the rod 1c of the first holder 1. When the second holder 2 is at the second position, the gripping unit 2b is positioned higher than the lower end of the rod 1c and the suction pad 1d of the first holder 1.

According to the third modification, similarly to the holding device 100, the convenience of the holding device 130 can be improved. By positioning the second holder 2 higher than at least a portion of the first holder 1 in the second operation, the interference of the second holder 2 with the article can be suppressed. The operation rate of the holding device 130 can be improved thereby.

Fourth Modification

Figure 17A:
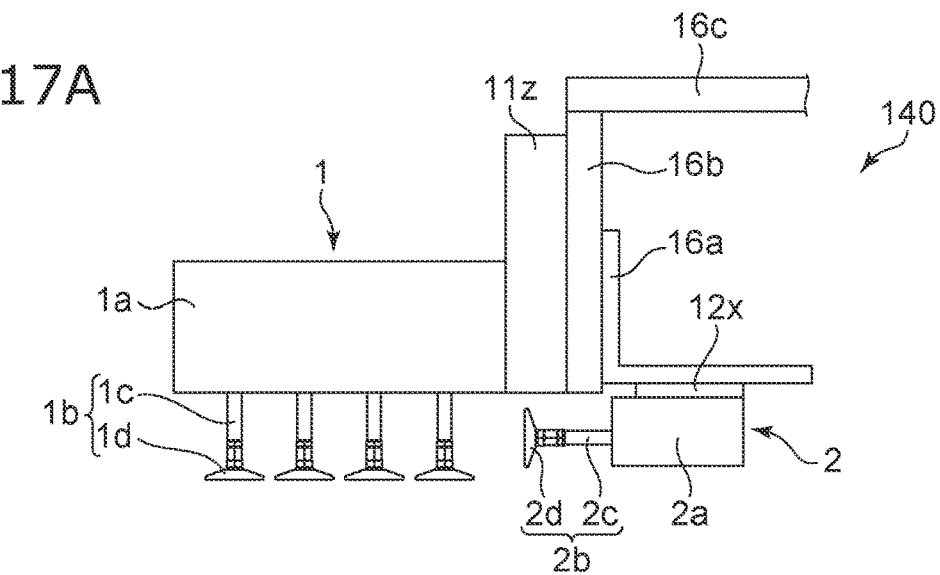
FIGS. 17A to 17C are side views schematically illustrating a first holder and a second holder of a holding device according to a fourth modification of the embodiment.
Figure 17B:
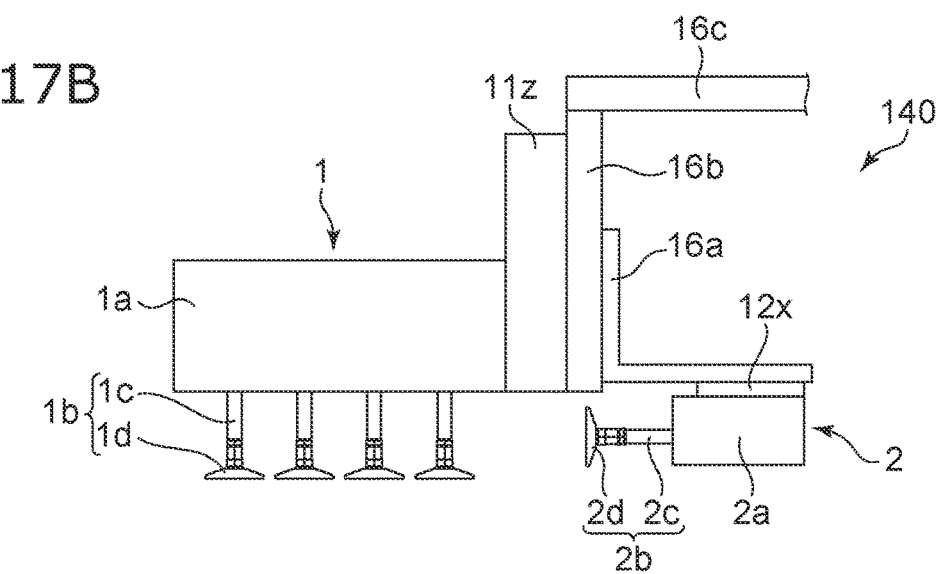
Figure 17C:
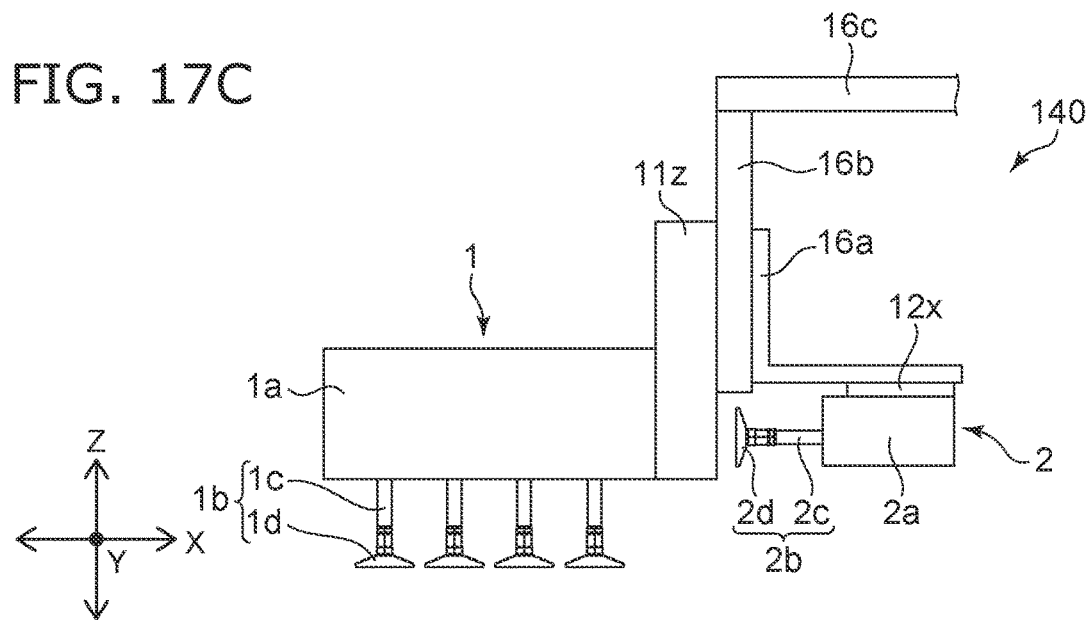

FIGS. 17A to 17C are side views schematically illustrating a first holder and a second holder of a holding device according to a fourth modification of the embodiment.

In the holding device 140 according to the fourth modification, the driver 12x moves the second holder 2 in the X-direction with respect to the first holder 1. A driver 11z moves the first holder 1 in the Z-direction with respect to the second holder 2.

For example, the second holder 2 is coupled to the support frame 16b via the driver 12x and the coupling part 16a. The first holder 1 is coupled to the support frame 16b via the driver 11z. The support frame 16b is fixed with respect to the arm 16c.

FIG. 17A illustrates the first state in which the second holder 2 is at the first position. When the holding device 140 transitions from the first state to the second state, the driver 12x moves the second holder 2 backward as illustrated in FIG. 17B. The driver 11z moves the first holder 1 downward with respect to the second holder 2. Thereby, as illustrated in FIG. 17C, the second holder 2 is positioned higher than at least a portion of the first holder 1. FIG. 17C illustrates the second state in which the second holder 2 is at the second position. The holding device 140 performs the first operation in the first state illustrated in FIG. 17A. The holding device 140 performs the second operation in the second state illustrated in FIG. 17C.

When the second holder 2 is at the first position, the gripping unit 2b is positioned lower than the housing 1a and the upper end of the rod 1c of the first holder 1. When the second holder 2 is at the second position, the gripping unit 2b is positioned higher than the lower end of the rod 1c and the suction pad 1d of the first holder 1.

According to the fourth modification, similarly to the holding device 100, the convenience of the holding device 140 can be improved. The interference of the second holder 2 with the article can be suppressed by positioning the second holder 2 higher than at least a portion of the first holder 1 in the second operation. The operation rate of the holding device 140 can be improved thereby.

Fifth Modification

Figure 18:
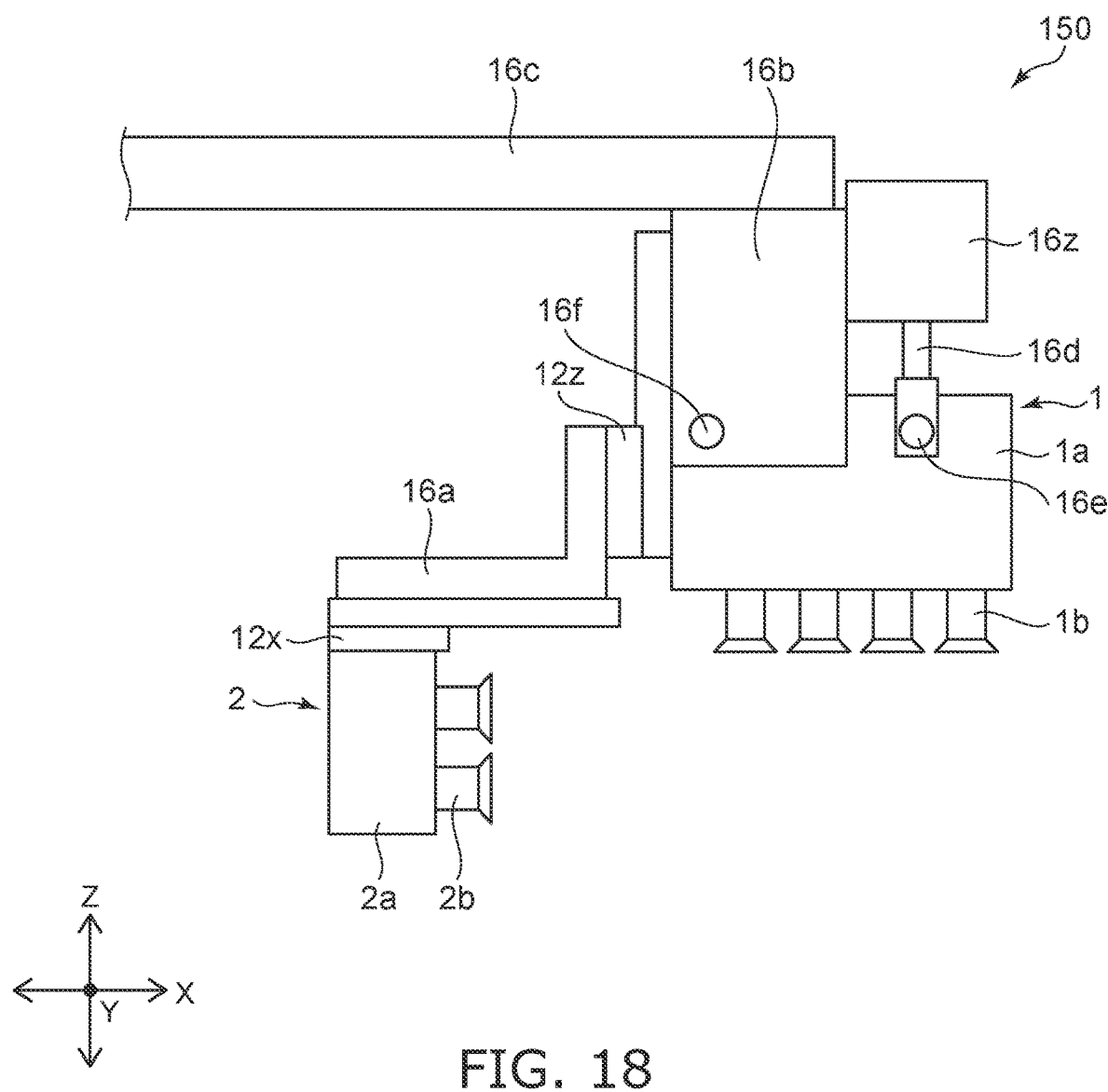
FIG. 18 is a side view schematically illustrating a first holder and a second holder of a holding device according to a fifth modification of the embodiment.

FIG. 18 is a side view schematically illustrating a first holder and a second holder of a holding device according to a fifth modification of the embodiment.

The tilts of the first and second holders 1 and 2 with respect to the X-Y plane may be changeable. For example, compared to the holding device 130, the holding device 150 according to the fifth modification further includes a rod 16d, a coupling part 16e, and a driver 16z as illustrated in FIG. 18.

The driver 16z is mounted to the support frame 16b. One end of the rod 16d is coupled to the driver 16z. The driver 16z slides the rod 16d in the Z-direction. The other end of the rod 16d is coupled to the first holder 1 via the coupling part 16e. The second holder 2 and the rod 16d are rotatably coupled to the coupling part 16e around the Y-direction.

The first holder 1 is rotatable around the Y-direction with respect to the support frame 16b around a rotary shaft 16f. The Z-direction position of the front portion of the first holder 1 changes according to the operation of the driver 16z. The Z-direction position of the front portion of the first holder 1 is fixed. Therefore, the tilt of the first holder 1 with respect to the X-Y plane changes when the driver 16z moves the rod 16d in the Z-direction. Simultaneously, the tilt of the second holder 2 with respect to the X-Y plane also changes. The tilts of the first and second holders 1 and 2 with respect to the support frame 16b and the arm 16c are changed by the operation of the driver 16z.

Figure 19A:
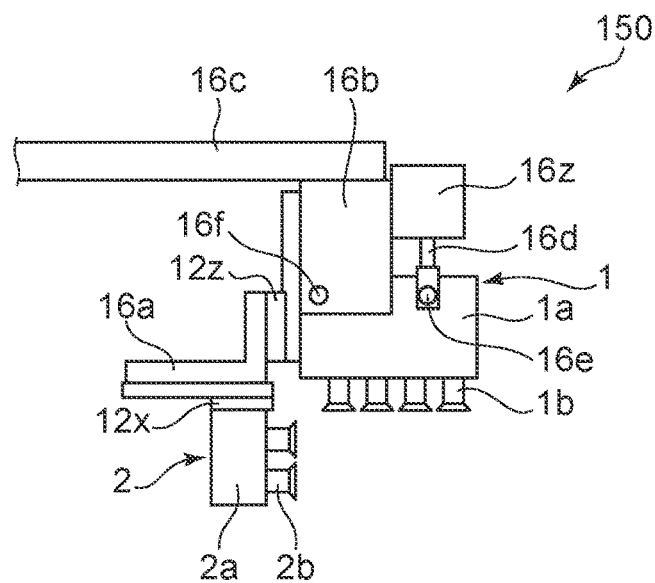
FIGS. 19A to 19C are side views schematically illustrating an operation of the holding device according to the fifth modification of the embodiment.
Figure 19B:
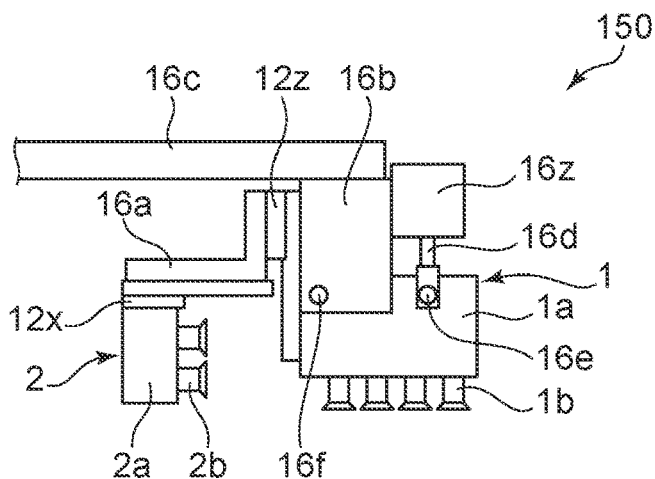
Figure 19C:
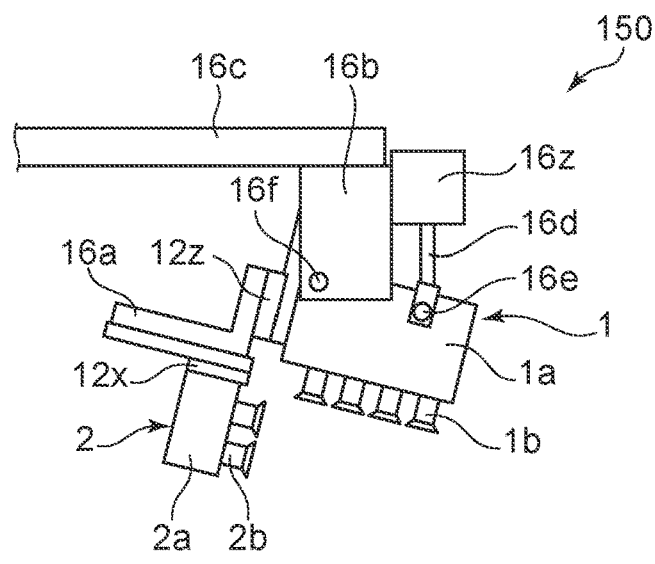

FIGS. 19A to 19C are side views schematically illustrating an operation of the holding device according to the fifth modification of the embodiment.

FIG. 19A illustrates a state when the holding device 150 is in the first state. FIG. 19B illustrates a state when the holding device 150 is in the second state. FIG. 19C illustrates the state when the holding device 150 is in the first state and the first holder 1 and the second holder 2 are tilted.

The holding device 150 tilts the first holder 1 and the second holder 2 when holding the article or when placing the article. For example, the holding device 150 tilts the first holder 1 and the second holder 2 after placing the article and releasing the gripping of the article. Thereby, the contact area between the first holder 1 and the article and the contact area between the second holder 2 and the article can be reduced even when there is no space to move the second holder 2 backward. The friction between the second holder 2 and the article when raising the first holder 1 and the second holder 2 can be reduced. As a result, damage of the article can be suppressed, the load of the drivers raising the first holder 1 and the second holder 2 can be reduced, etc.

Sixth Modification

Figure 20A:
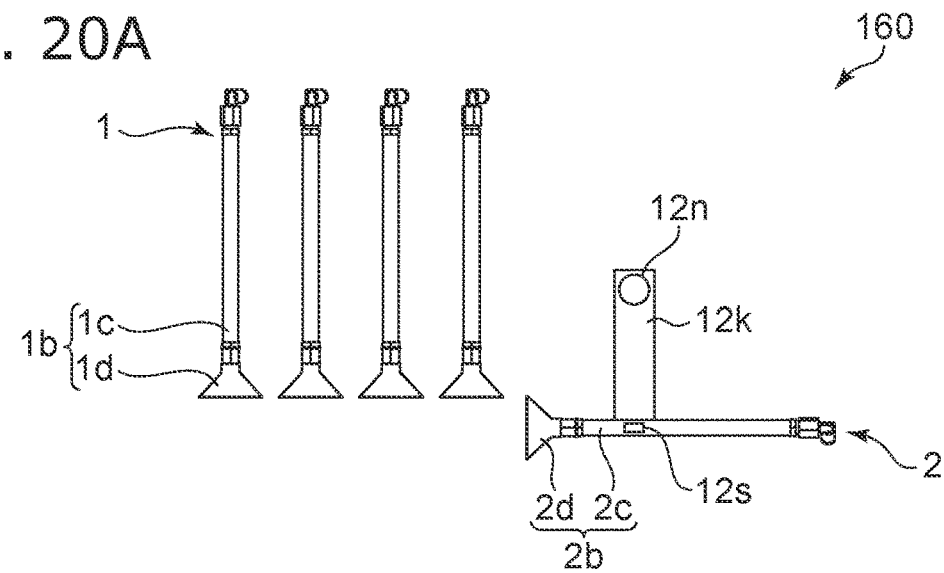
FIGS. 20A to 20C are side views schematically illustrating a first holder and a second holder of a holding device according to a sixth modification of the embodiment.
Figure 20B:
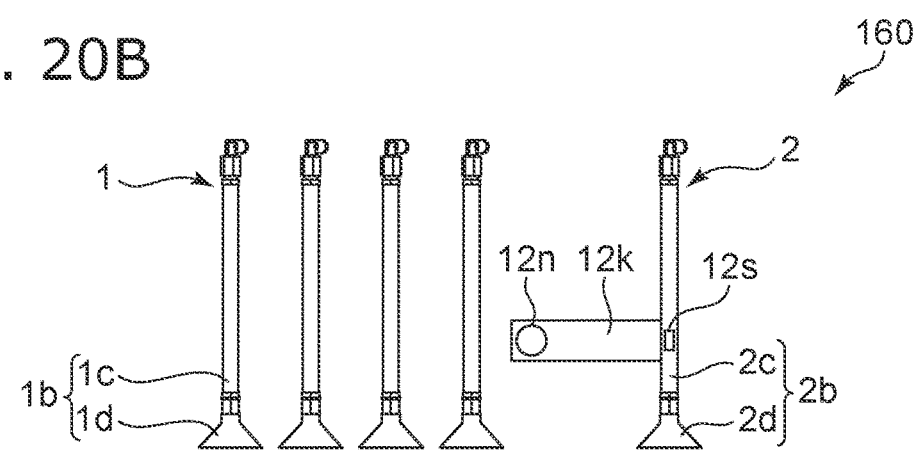
Figure 20C:
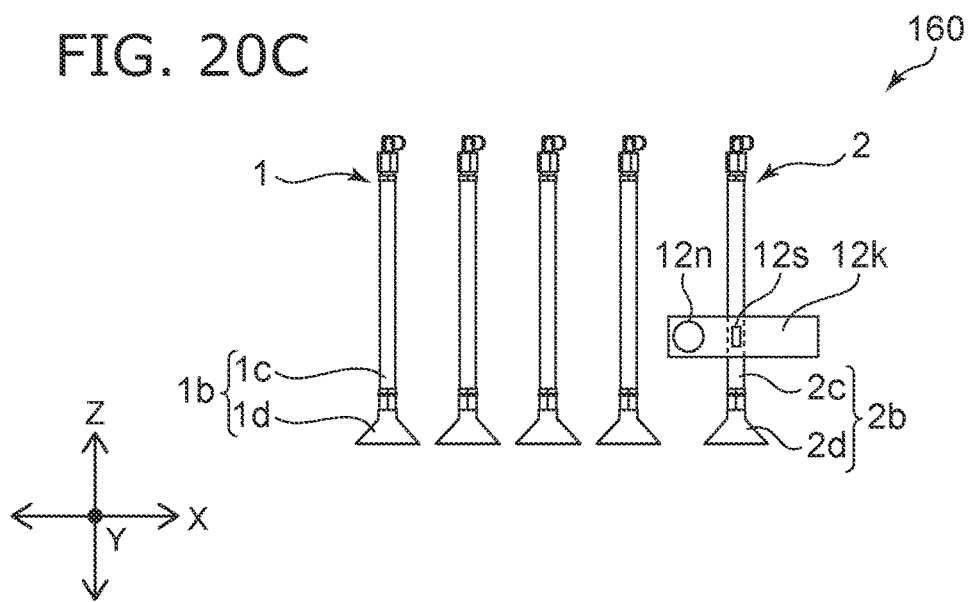

FIGS. 20A to 20C are side views schematically illustrating a first holder and a second holder of a holding device according to a sixth modification of the embodiment.

The second holder 2 may rotate to change the orientation of the gripping surface of the suction pad 2d. As illustrated in FIG. 20A, the second holder 2 is coupled to the link 12k. One end of the link 12k is coupled to the actuator 12n. The link 12k and the second holder 2 are rotated by the actuator 12n. The rotation center of the second holder 2 is positioned higher than the gripping surface of the suction pad 1d and is parallel to the Y-direction. The level of the suction pad 2d is changed by the rotation of the second holder 2.

FIG. 20A illustrates the first state in which the second holder 2 is at the first position. When the second holder 2 is at the first position, the gripping unit 2b is positioned lower than the upper end of the rod 1c. When the second holder 2 moves from the first position to the second position, the second holder 2 is rotated by the actuator 12n as illustrated in FIG. 20B. The second holder 2 reaches the same level as the first holder 1. In other words, the gripping surface of the suction pad 2d reaches the same level as the gripping surface of the suction pad 1d. The second holder 2 can hold the upper surface of the article when the first holder 1 holds the upper surface of the article.

The second holder 2 may be slidable along the link 12k. For example, a driver 12s is coupled to the second holder 2 and the link 12k. The driver 12s causes the second holder 2 to slide along the link 12k. As illustrated in FIG. 20C, the distance between the first holder 1 and the second holder 2 is reduced by the operation of the driver 12s. In other words, the distance between the second holder 2 and the article is reduced when the first holder 1 holds the article. Thereby, the second holder 2 can easily contact the upper surface of the article.

FIG. 20B or FIG. 20C illustrate the second state in which the second holder 2 is at the second position. For example, the holding device 160 performs the first operation of transferring the articles of the first arrangement in the first state illustrated in FIG. 20A. The holding device 160 performs the second operation of transferring the articles of the second arrangement in the second state illustrated in FIG. 20C.

According to the sixth modification, similarly to the holding device 100, the convenience of the holding device 160 can be improved. Furthermore, the interference of the second holder 2 with the article can be suppressed by the second holder 2 approaching the first holder 1 in the second operation. For example, the interference between the second holder 2 and the lift 30 can be suppressed, and the operation rate of the holding device 160 can be improved.

Seventh Modification

Figure 21:
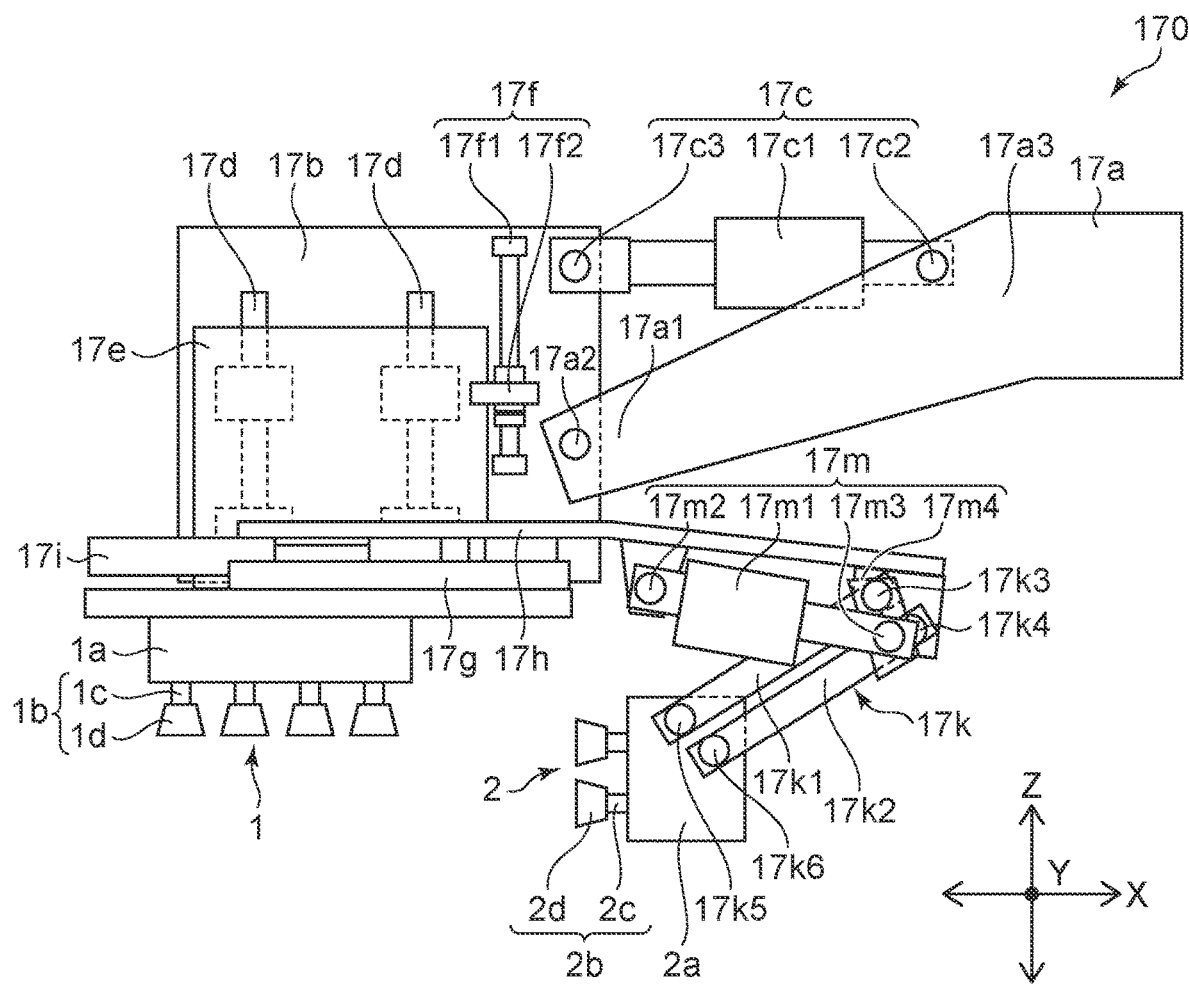
FIG. 21 is a side view schematically illustrating a portion of a holding device according to a seventh modification of the embodiment.

FIG. 21 is a side view schematically illustrating a portion of a holding device according to a seventh modification of the embodiment.

As shown in FIG. 21, the holding device 170 according to the seventh modification includes an arm 17a, a base 17b, a tilt mechanism 17c, a linear guide 17d, a coupling frame 17e, a fixing mechanism 17f, a linear guide 17g, a coupling plate 17h, a cylinder 17i, a linkage 17k, and a drive mechanism 17m (an example of a fourth driver).

The arm 17a is connected with an X-Y orthogonal robot (an example of the first driver) that is included as the drivers 11x and 11y. The arm 17a may be a portion of an X-Y orthogonal robot. The base 17b is a plate member that spreads along the X-Z plane. The back end of the lower portion of the base 17b is coupled with a tip 17a1 of the arm 17a via a rotary shaft 17a2, and is rotatable with respect to the tip 17a1.

The tilt mechanism 17c is located between the arm 17a and the base 17b. Specifically, the tilt mechanism 17c includes a cylinder 17c1, a rotary shaft 17c2, and a rotary shaft 17c3. The arm 17a includes a bent portion 17a3 that is bent downward. One end of the cylinder 17c1 is coupled to the bent portion 17a3 via the rotary shaft 17c2 and is rotatable with respect to the bent portion 17a3. The other end of the cylinder 17c1 is coupled to the back end of the upper portion of the base 17b via the rotary shaft 17c3 and is rotatable with respect to the back end. The rotation centers of the rotary shafts 17a2, 17c2, and 17c3 are parallel to the Y-direction.

The cylinder 17c1 is extendable and retractable along the X-direction. The levels at which the cylinder 17c1, the rotary shaft 17c2, and the rotary shaft 17c3 are located are different from the level at which the rotary shaft 17a2 is located. Thereby, the angle of the base 17b around the Y-direction is changed when the length of the cylinder 17c1 is changed. The cylinder 17c1, the rotary shaft 17c2, and the rotary shaft 17c3 are positioned above the rotary shaft 17a2 in the holding device 170. For example, the front end of the base 17b is tilted downward by the extension of the cylinder 17c1.

The linear guide 17d is located at the side surface of the base 17b. In the holding device 170, two linear guides 17d are located at one side surface of the base 17b. The linear guide 17d includes a rail and a block. The rail is fixed with respect to the base 17b and is located along the Z-direction. The block is movable in the Z-direction along the rail. The coupling frame 17e is fixed with respect to the block of the linear guide 17d. Thereby, the coupling frame 17e is movable in the Z-direction with respect to the base 17b.

The fixing mechanism 17f is located at the side surface of the base 17b proximate to the coupling frame 17e. The fixing mechanism 17f is switchable between a locked state in which the coupling frame 17e is fixed and an unlocked state in which the coupling frame 17e is movable. Specifically, the fixing mechanism 17f includes a rod 17f1 and a clamper 17f2. The rod 17f1 is fixed with respect to the base 17b and extends along the Z-direction. The clamper 17f2 is coupled to the coupling frame 17e and is slidable in the Z-direction along the rod 17f1. In the locked state, the clamper 17f2 is fixed with respect to the rod 17f1, and the coupling frame 17e also is fixed thereby.

The first holder 1 is fixed with respect to the coupling frame 17e. The linear guide 17g is located along the upper surface of the housing 1a. The linear guide 17g includes a rail and a block. The rail is fixed with respect to the housing 1a and extends along the X-direction. The block is movable in the X-direction along the rail.

The coupling plate 17h is a plate member that extends along the X-direction. The front portion of the coupling plate 17h is parallel to the X-Y plane and is fixed with respect to the blocks of the linear guides 17g. Thereby, the coupling plate 17h is movable in the X-direction with respect to the first holder 1. The back portion of the coupling plate 17h is slightly tilted downward.

The cylinder 17i (an example of the second driver) is coupled to the coupling plate 17h and the housing 1a of the first holder 1. The cylinder 17i is extendable and retractable along the X-direction. The coupling plate 17h moves in the X-direction with respect to the first holder 1 when the cylinder 17i extends or contracts. Thereby, the second holder 2 that is coupled to the coupling plate 17h is moved along the X-direction.

The linkage 17k is coupled between the coupling plate 17h and the second holder 2. The linkage 17k includes a pair of links 17k1 and 17k2. The links 17k1 and 17k2 extend parallel to each other and are synchronously rotatable. One end of the link 17k1 and one end of the link 17k2 are coupled respectively via rotary shafts 17k3 and 17k4 with the back end of the coupling plate 17h. The rotary shafts 17k3 and 17k4 are rotatable with respect to the coupling plate 17h. On the other hand, the links 17k1 and 17k2 are respectively fixed with respect to the rotary shafts 17k3 and 17k4. Therefore, the links 17k1 and 17k2 also rotate when the rotary shafts 17k3 and 17k4 rotate with respect to the coupling plate 17h.

The drive mechanism 17m is coupled to the coupling plate 17h and the linkage 17k and changes the Z-direction position of the second holder 2. Specifically, the drive mechanism 17m includes a cylinder 17m1, a rotary shaft 17m2, a rotary shaft 17m3, and a bar 17m4. The cylinder 17m1 is located along the back portion of the coupling plate 17h. The tube main body of the cylinder 17m1 is coupled with the coupling plate 17h via the rotary shaft 17m2 and is rotatable with respect to the coupling plate 17h. The piston of the cylinder 17m1 is coupled to one end of the bar 17m4 via the rotary shaft 17m3 and is rotatable with respect to the bar 17m4. The other end of the bar 17m4 is fixed with respect to one of a rotary shaft 17*k*3 or 17*k*4. In the holding device 170, the bar 17*m*4 is fixed with respect to the rotary shaft 17*k*3. The second holder 2 is coupled with the other end of the link 17*k*1 and the other end of the link 17*k*2 respectively via rotary shafts 17*k*5 and 17*k*6 and is rotatable with respect to the links 17*k*1 and 17*k*2.

Figure 22A:
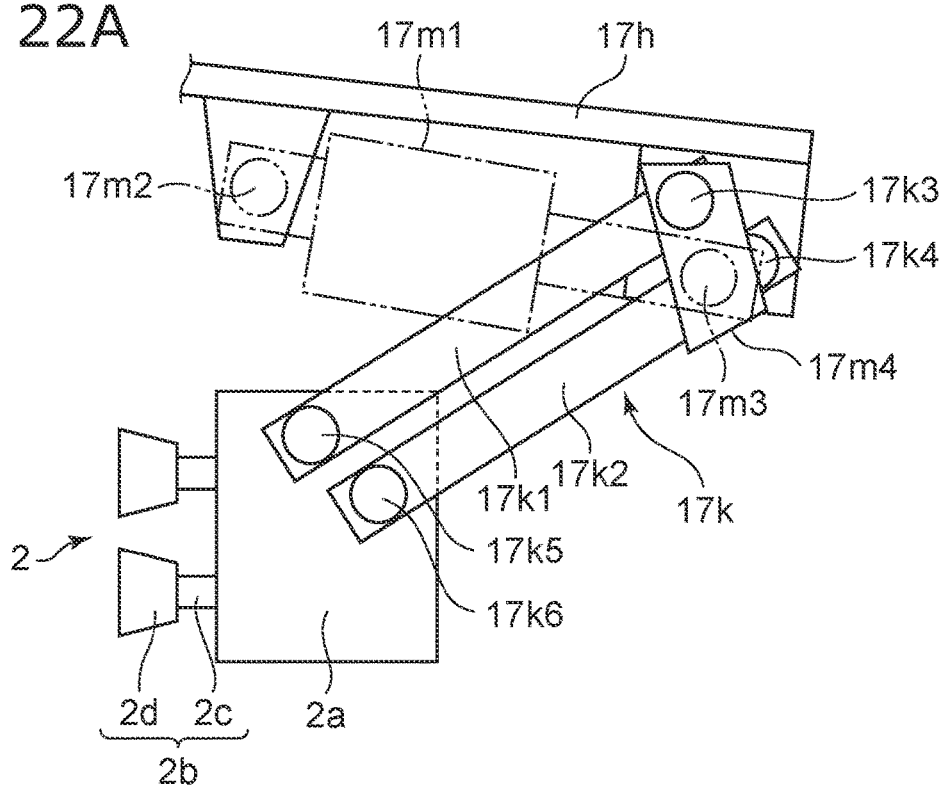
FIGS. 22A and 22B are side views schematically showing operations of the holding device according to the seventh modification of the embodiment.
Figure 22B:
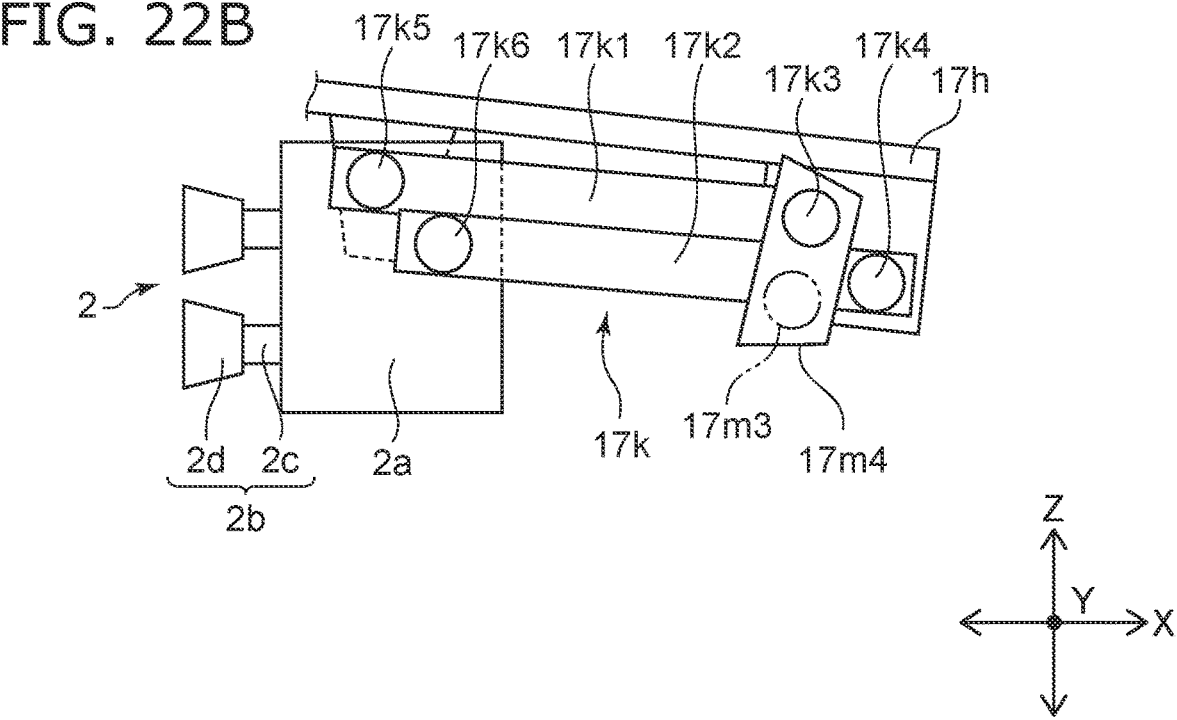

FIGS. 22A and 22B are side views schematically showing operations of the holding device according to the seventh modification of the embodiment. The cylinder 17*m*1, the rotary shaft 17*m*2, and the rotary shaft 17*m*3 are illustrated by double dot-dash lines in FIG. 22A. In FIG. 22B, the cylinder 17*m*1 and the rotary shaft 17*m*2 are not illustrated, and the rotary shaft 17*m*3 is illustrated by a dashed line. FIG. 22A illustrates a state in which the second holder 2 is at the first position; and FIG. 22B illustrates a state in which the second holder 2 is at the second position.

The rotary shafts 17*k*3 to 17*k*6, 17*m*2, and 17*m*3 are parallel to the Y-direction. As illustrated in FIGS. 22A and 22B, the bar 17*m*4 rotates around the Y-direction with the rotary shaft 17*k*3 as a center when the cylinder 17*m*1 extends or contracts. Because the bar 17*m*4 is fixed with respect to the rotary shaft 17*k*3, the rotary shaft 17*k*3 rotates according to the rotation of the bar 17*m*4. The link 17*k*1 that is fixed to the rotary shaft 17*k*3 rotates around the Y-direction with the rotary shaft 17*k*3 as a center. The link 17*k*2 also rotates around the Y-direction synchronously with the link 17*k*1. Thereby, the second holder 2 rotates around the Y-direction with the rotary shaft 17*k*3 as a center. The position in the X-Z plane of the second holder 2 can be changed by the operation of the drive mechanism 17*m*. In the second state illustrated in FIG. 22B, the gripping unit 2*b* is positioned higher than the housing 1*a* and the gripping unit 1*b* of the first holder 1.

FIGS. 23A to 23D are side views schematically showing states when the suction hand according to the embodiment holds the article.

FIGS. 23A to 23C illustrate the first operation. FIG. 23D illustrates the second operation. When the article is gripped, the first holder 1 contacts the upper surface of the article A and grips the upper surface as shown in FIG. 23A. Then, as shown in FIG. 23B, the second holder 2 is caused to contact the side surface of the article A by the operation of the cylinder 17*i*. The second holder 2 grips the side surface. The holding device 170 holds the article A by the gripping of the upper surface and the side surface of the article A.

Continuing, the holding device 170 is raised. At this time, the cylinder 17*c*1 is extended by the weight of the first holder 1, the second holder 2, the article A, etc., when the cylinder 17*c*1 is released or the thrust due to the cylinder 17*c*1 is weak. Thereby, as shown in FIG. 23C, the first holder 1 and the second holder 2 are tilted with respect to the X-Y plane in the state in which the article A is held. There is a possibility that the contents of the article A may be broken if the tilt is too large. Therefore, it is favorable for the tilt angle with respect to the X-Y plane to be greater than 0 degrees and less than 15 degrees.

For example, an adhesive for adhering a label, an adhesive of tape for packaging, etc., can be adhered to the upper surface of the article A. There are cases where the upper surface of another article A is stuck by the adhesive to the bottom surface of the article A that is held. By tilting, the article A that is held can be easily peeled from the other article A. Thereby, the friction between the other article A and the article A that is transferred can be reduced when transferring the article A.

As shown in FIG. 23D, in the second operation, the holding device 170 also can grip the article A by attaching only the first holder 1 to the upper surface of the article A. At this time, the second holder 2 is positioned at the same level as the first holder or higher than at least a portion of the first holder 1. Subsequently, similarly to FIG. 23C, the first holder 1 may be tilted with respect to the X-Y plane in the state in which the article A is gripped.

According to the seventh modification, similarly to the holding device 100, the first state in which the second holder 2 is at the first position and the second state in which the second holder 2 is at the second position can be switched. Therefore, the convenience of the holding device 170 can be improved. In the second state, similarly to the holding device 100, the second holder 2 can be positioned higher than the first holder 1. Thereby, the likelihood of interference with the other article A of the article A held by the second holder 2 can be further reduced.

Eighth Modification

Figure 24:
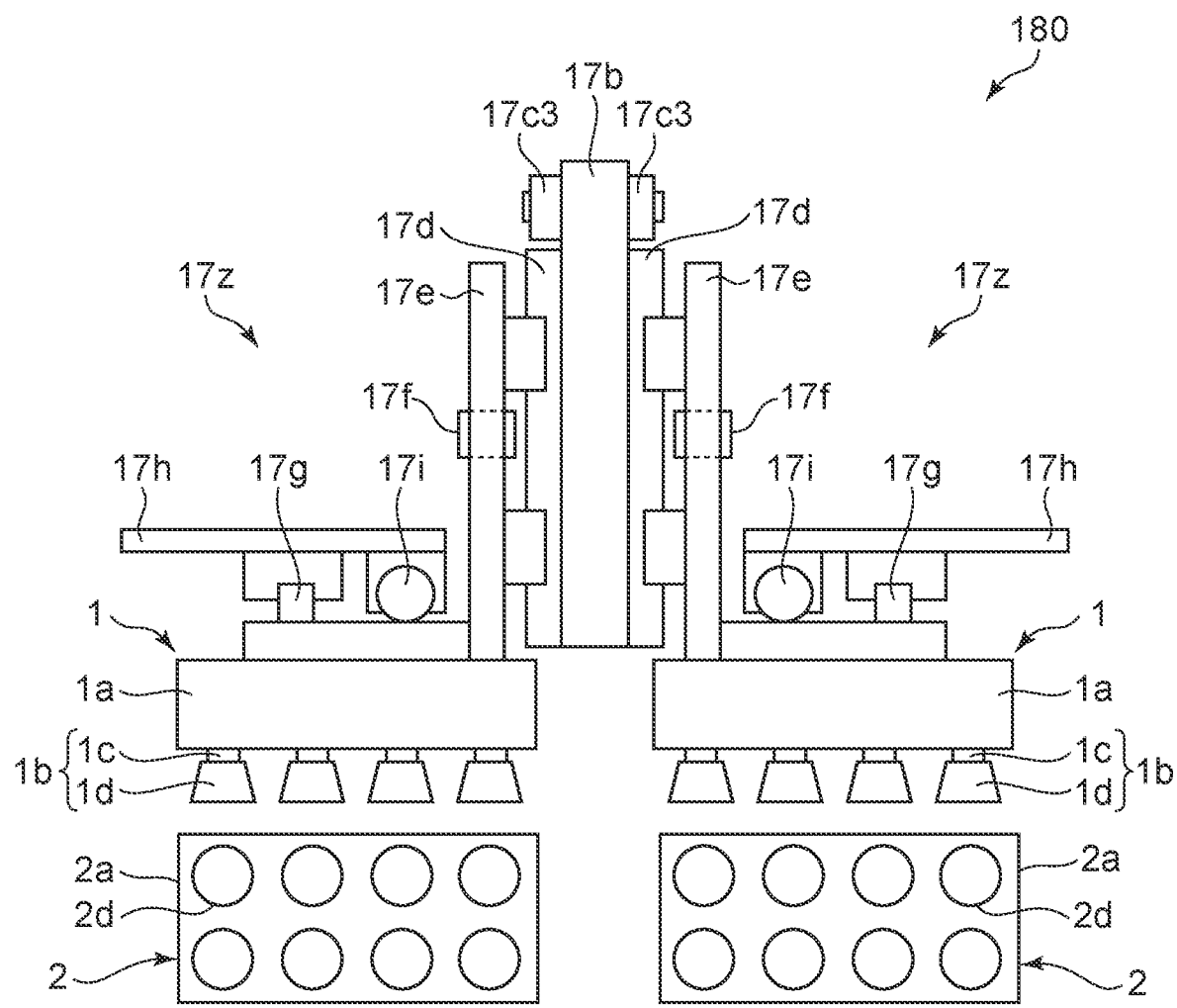
FIG. 24 is a front view schematically illustrating a portion of a holding device according to an eighth modification of the embodiment.

FIG. 24 is a front view schematically illustrating a portion of a holding device according to an eighth modification of the embodiment.

The holding device 180 according to the eighth modification differs from the holding device 170 in that multiple first holders 1 and multiple second holders 2 are included as shown in FIG. 24.

Suction mechanisms 17*z* that each include the first holder 1, the second holder 2, the linear guide 17*d*, the coupling frame 17*e*, the fixing mechanism 17*f*, the linear guide 17*g*, the coupling plate 17*h*, the cylinder 17*i*, the linkage 17*k*, and the drive mechanism 17*m* are located respectively at two side surfaces of the base 17*b*. Thereby, the multiple first holders 1 and the multiple second holders 2 are arranged in the Y-direction.

Figure 25:
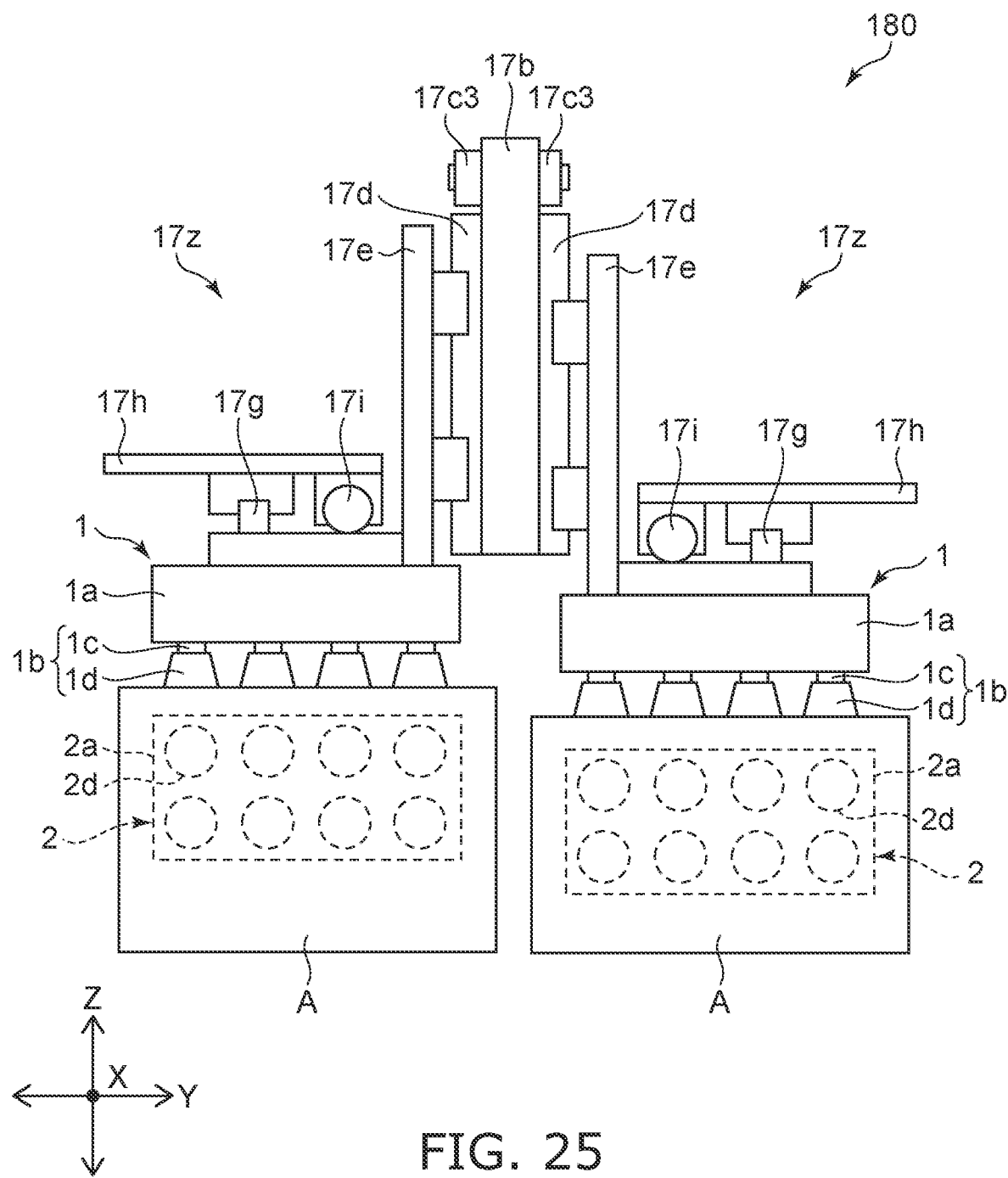
FIG. 25 is a front view schematically showing a state when the holding device according to the eighth modification of the embodiment holds articles.
Figure 26:
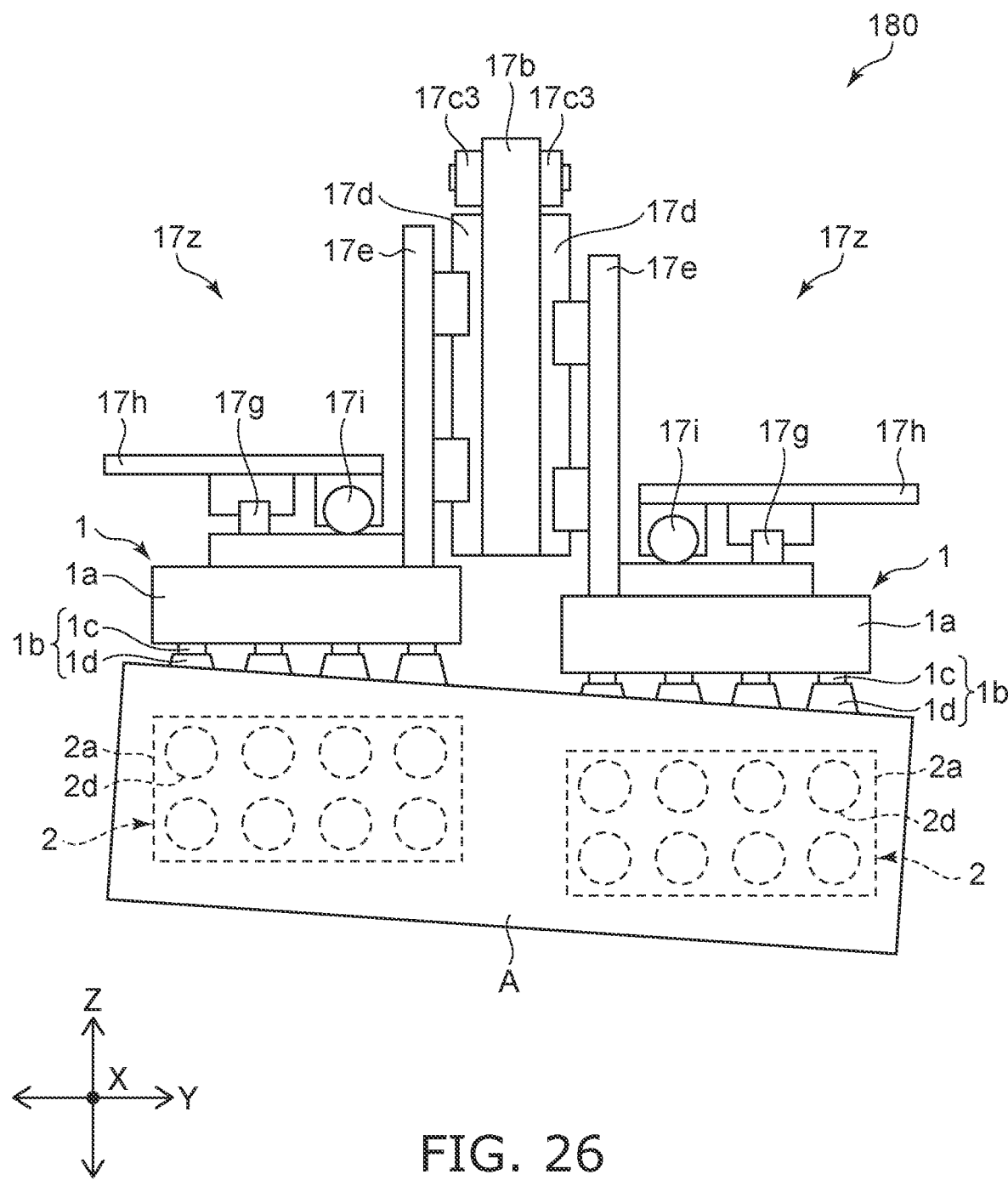
FIG. 26 is a front view schematically showing a state when the holding device according to the eighth modification of the embodiment holds articles.

FIGS. 25 and 26 are front views schematically showing states when the holding device according to the eighth modification of the embodiment holds articles.

The suction mechanisms 17*z* are mutually-independently movable. The cylinders 17*i* and 17*m*1 are independently operable for each suction mechanism 17*z*. Therefore, as shown in FIGS. 25 and 26, the positions in the Z-direction of the first holders 1 may be different from each other. The positions in the X-Z plane of the second holders 2 may be different from each other.

As shown in FIG. 25, multiple suction mechanisms 17*z* may hold multiple articles A. As shown in FIG. 26, multiple suction mechanisms 17*z* may grip one article A. As an example, the shapes of the gripped articles A are rectangular parallelepipeds as shown in FIGS. 25 and 26. The upper surface of the article A may be tilted with respect to the X-Y plane. As shown in FIG. 26, the article of which the upper surface is tilted can be stably gripped by the positions in the Z-direction of the suction mechanisms 17*z* changing according to the upper surface and by the suction pads 2*d* deforming according to the position of the upper surface.

According to the eighth modification, compared to the holding device 170, diverse articles can be more stably held. The convenience of the holding device 180 can be further improved thereby.

The forms described above can be combined as appropriate as long as the first state and the second state can be switched. For example, the fourth modification may be combined with the third modification. For example, both the first holder 1 and the second holder 2 may be movable in the vertical direction. The coupler 15 may be included in the holding devices 100, 110, 130, 140, 150, 160, 170, and 180 as in the holding device 120. In the holding devices 100 to 140 and 160, the tilts of the first and second holders 1 and 2 with respect to the X-direction may be changeable.

An example is described above in which the first holder 1 and the second holder 2 hold the article by suction. The first holder 1 and the second holder 2 may hold the article by clamping. For example, the first holder 1 clamps two ends of the upper surface of the article. The second holder 2 clamps two ends of the side surface of the article. In such a case as well, the convenience of the holding device can be improved by the structures of the first and second holders 1 and 2 described above.

Figure 27:
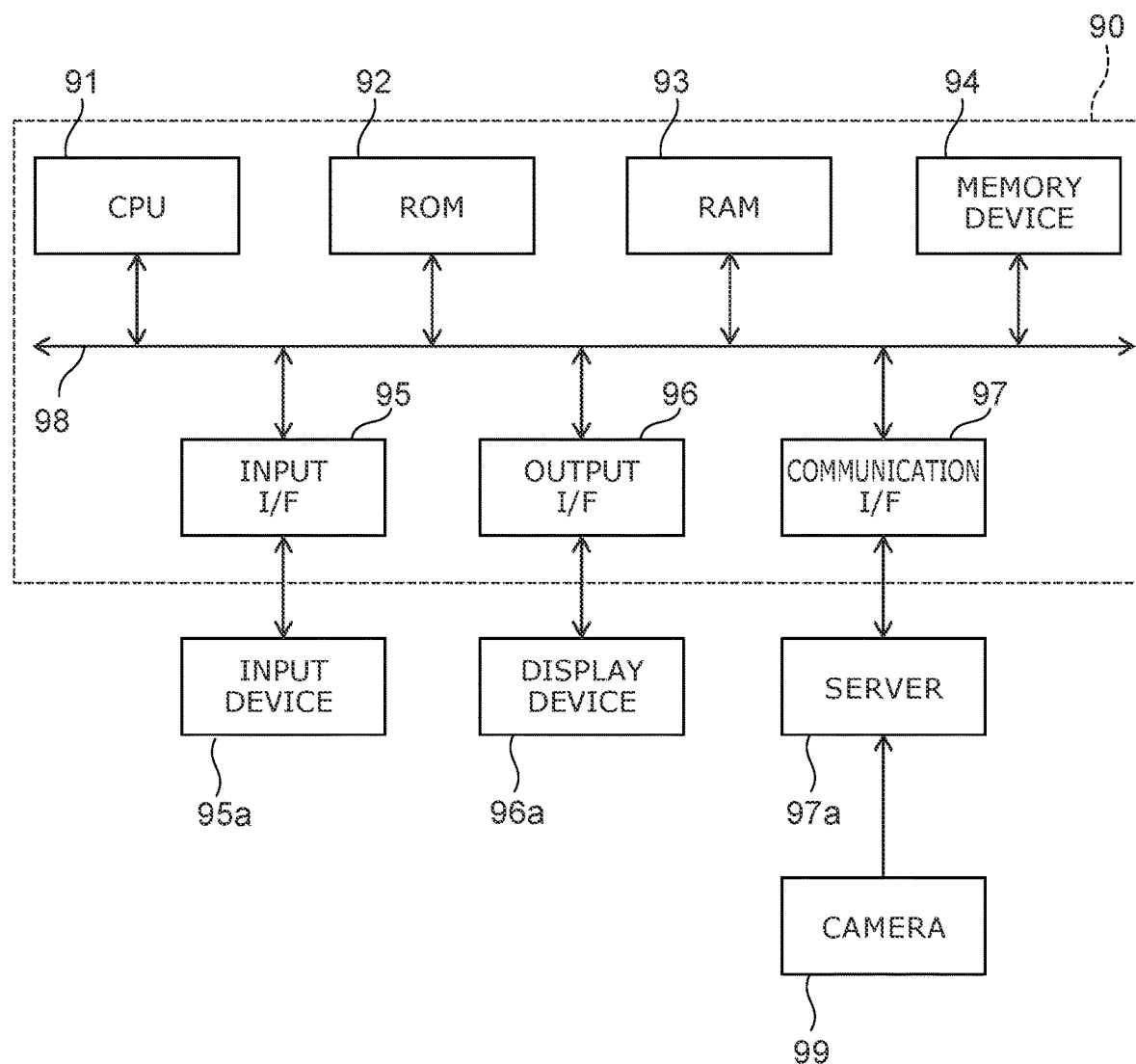
FIG. 27 is a schematic view illustrating a hardware configuration.

FIG. 27 is a schematic view illustrating a hardware configuration.

For example, the controller 50 has the hardware configuration illustrated in FIG. 27. A processing device 90 illustrated in FIG. 27 includes a CPU 91, ROM 92, RAM 93, a memory device 94, an input interface 95, an output interface 96, and a communication interface 97.

The ROM 92 stores programs that control the operations of a computer. Programs that are necessary for causing the computer to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the processing device 90 and an input device 95a. The input I/F 95 is, for example, a serial bus interface such as USB, etc. The CPU 91 can read various data from the input device 95a via the input I/F 95.

The output interface (I/F) 96 connects the processing device 90 and an output device 96a. The output I/F 96 is, for example, an image output interface such as Digital Visual Interface (DVI), High-Definition Multimedia Interface (HDMI (registered trademark)), etc. The CPU 91 can transmit the data to the output device 96a via the output I/F 96 and cause the output device 96a to display an image.

The communication interface (I/F) 97 connects the processing device 90 and a server 97a that is outside the processing device 90. The communication I/F 97 is, for example, a network card such as a LAN card, etc. The CPU 91 can read various data from the server 97a via the communication I/F 97. A camera 99 images articles and stores the images in the server 97a. The camera 99 functions as the detector 35.

The memory device 94 includes not less than one selected from a hard disk drive (HDD) and a solid state drive (SSD). The input device 95a includes not less than one selected from a mouse, a keyboard, a microphone (audio input), and a touchpad. The output device 96a includes not less than one selected from a monitor and a projector. A device such as a touch panel that functions as both the input device 95a and the output device 96a may be used.

According to embodiments described above, a convenient holding device, cargo handling apparatus, or holding method can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A holding device, comprising:
a first holder configured to hold an upper surface of an object; and
a second holder configured to hold a side surface of the object,
the holding device performing at least
a first operation of the first and second holders holding the object, the first operation being performed in a first state in which the second holder can hold the side surface of the object, and
a second operation of the first holder holding the object, the second operation being performed in a second state in which the second holder is positioned higher than at least a portion of the first holder,
in a switching from the first state to the second state, as the second holder moves upward, a distance between the first holder and the second holder in a longitudinal direction, when viewed along a vertical direction, becomes shorter.

2. The device according to claim 1, further comprising:
a first driver driving the first holder along the longitudinal direction; and
a second driver driving the second holder along the longitudinal direction with respect to the first holder.

3. The device according to claim 1, wherein
in the first state, the second holder is at a first position, and
in the second state, the second holder is at a second position separated from the first position.

4. The device according to claim 1,
wherein at least a portion of the second holder is positioned directly above the first holder in the second state.

5. The device according to claim 1, wherein
the first state and the second state are switched by rotating the second holder around a rotation center, and
the rotation center is along a lateral direction and is located at a different position from the second holder.

6. The device according to claim 1, wherein
a plurality of the first holders and a plurality of the second holders are arranged in a lateral direction.

7. The device according to claim 6, wherein
the plurality of first holders is mutually-independently movable in a vertical direction.

8. A cargo handling apparatus, comprising:
a third driver driving the first and second holders in vertical direction;
a lift on which the object is placed, the lift moving in the vertical direction; and
the holding device according to claim 1.

9. The apparatus according to claim 8, further comprising:
a first supporter and a second supporter supporting the first holder and the second holder, the first supporter and the second supporter being separated from each other in a lateral direction,
a length in the lateral direction of the lift being greater than a length in the lateral direction between the first supporter and the second supporter.

10. The apparatus according to claim 9, wherein the first holder and the second holder are movable to a position not interfering with the lift when the lift is moved to be higher than the first holder.

11. The apparatus according to claim 8, further comprising:
a controller,
the controller receiving data of an arrangement of the object and switching a position of the second holder according to the data.

12. A holding device, comprising:
a first holder configured to hold an upper surface of an object; and
a second holder configured to hold a side surface of the object,
the second holder being movable between
a first position that is lower than at least a portion of the first holder, and
a second position that is higher than the at least a portion of the first holder,
at least a portion of the second holder being positioned directly above the first holder when the second holder is at the second position.

13. The device according to claim 12, further comprising:
a fourth driver changing a position in a vertical direction of the second holder by moving the second holder with respect to the first holder.

14. A holding method, comprising:
using a holding device to perform at least a first operation and a second operation, the holding device including
a first holder configured to hold an upper surface of an article object, and
a second holder configured to hold a side surface of the article object,
only the first holder holding the object in the second operation,
in the first operation, the first holder and the second holder holding the object in a first state in which the second holder can hold the side surface of the object,
in the second operation, the first holder holding the object in a second state in which the second holder is positioned higher than at least a portion of the first holder,
in a switching from the first state to the second state, as the second holder moves upward, a distance between the first holder and the second holder in a longitudinal direction, when viewed along a vertical direction, becomes shorter.

15. The method according to claim 14, wherein:
the second holder is positioned at a first position in the first operation,
the second holder can hold the side surface of the object at the first position, and
the second holder is positioned at a second position separated from the first position in the second operation.

16. The method according to claim 15, wherein the second position is higher than the first position.

17. The method according to claim 14, wherein the holding device is caused to receive data of an arrangement of the object, and switch a position of the second holder according to the data.

* * * * *